(12) United States Patent
Rothaar

(10) Patent No.: US 7,948,668 B2
(45) Date of Patent: May 24, 2011

(54) SCANNING MIRROR CONTROL HAVING LEAST MEAN SQUARE TONE ADDER

(75) Inventor: Bruce C. Rothaar, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 505 days.

(21) Appl. No.: 12/239,711

(22) Filed: Sep. 26, 2008

(65) Prior Publication Data

US 2010/0079836 A1    Apr. 1, 2010

(51) Int. Cl.
*G02B 26/08* (2006.01)
(52) U.S. Cl. .................................. 359/224.1
(58) Field of Classification Search .... 359/223.1–226.1, 359/197.1
See application file for complete search history.

(56) References Cited

U.S. PATENT DOCUMENTS

| | | | |
|---|---|---|---|
| 3,952,217 A | 4/1976 | Rawlings | |
| 5,751,465 A | 5/1998 | Melville et al. | |
| 6,697,096 B2* | 2/2004 | Agorio | 347/243 |
| 2005/0077860 A1 | 4/2005 | Hagen | |

OTHER PUBLICATIONS

Microvision, "PCT Search Report and Written Opinion", *PCT/US2009/056036—Search Report and Written Opinion for PCT case corresponding to U.S. Case* Apr. 1, 2010, All.
Wang, C. et al., "Implementation of Phased-Locked Loop Control for MEMS Scanning Mirror Using DSP", *Sensors and Actuators A*, vol. 133 2007, 243-249.
Schneider, Gregory, "Taming Resonance in Servos", *Machine Design* Feb. 7, 1985, 73-76.
Sprague, Randall et al., "Bi-Axial Magnetic Drive for Scanned Beam Display Mirrors", *SPIE vol. 5721* Feb. 28, 2005, 1-14.

\* cited by examiner

*Primary Examiner* — Euncha P Cherry
(74) *Attorney, Agent, or Firm* — Kevin D. Wills

(57) ABSTRACT

A scanning beam projection system includes a scanning mirror having a fast-scan axis and a slow-scan axis. Movement on the slow-scan axis is controlled by a slow-scan scanning mirror control system. The control system receives position information describing angular displacement of the mirror. An outer loop of the control system includes least mean square (LMS) tone adders that determine harmonically related signals that when combined produce a scanning mirror drive signal. An inner loop of the control system compensates for a scanning mirror resonant vibration mode at a frequency within the frequency band occupied by the harmonically related signals.

20 Claims, 22 Drawing Sheets

SCANNING MIRROR CONTROL HAVING LEAST MEAN SQUARE TONE ADDER

FIELD

The present invention relates generally to scanning beam display systems, and more specifically to controlling the deflection of scanning mirrors in scanning beam display systems.

BACKGROUND

Scanned light beams are used to produce display images for a wide variety of applications, including such applications as mobile microprojectors, automotive head-up displays, and head-worn displays. The displays are created by using the angular motion of a mirror to deflect a modulated light beam to cover the desired field of view. By moving the mirror about two orthogonal axes, a rectangular field of view can be created, providing the familiar look of a raster display in a compact and portable package.

Controlling the mirror deflection to correctly produce the desired angular motion presents a significant engineering challenge. This is due, in part, to the fact that mirrors are mechanical devices that exhibit vibration modes at various resonant frequencies.

DESCRIPTION OF EMBODIMENTS

Figure 1:
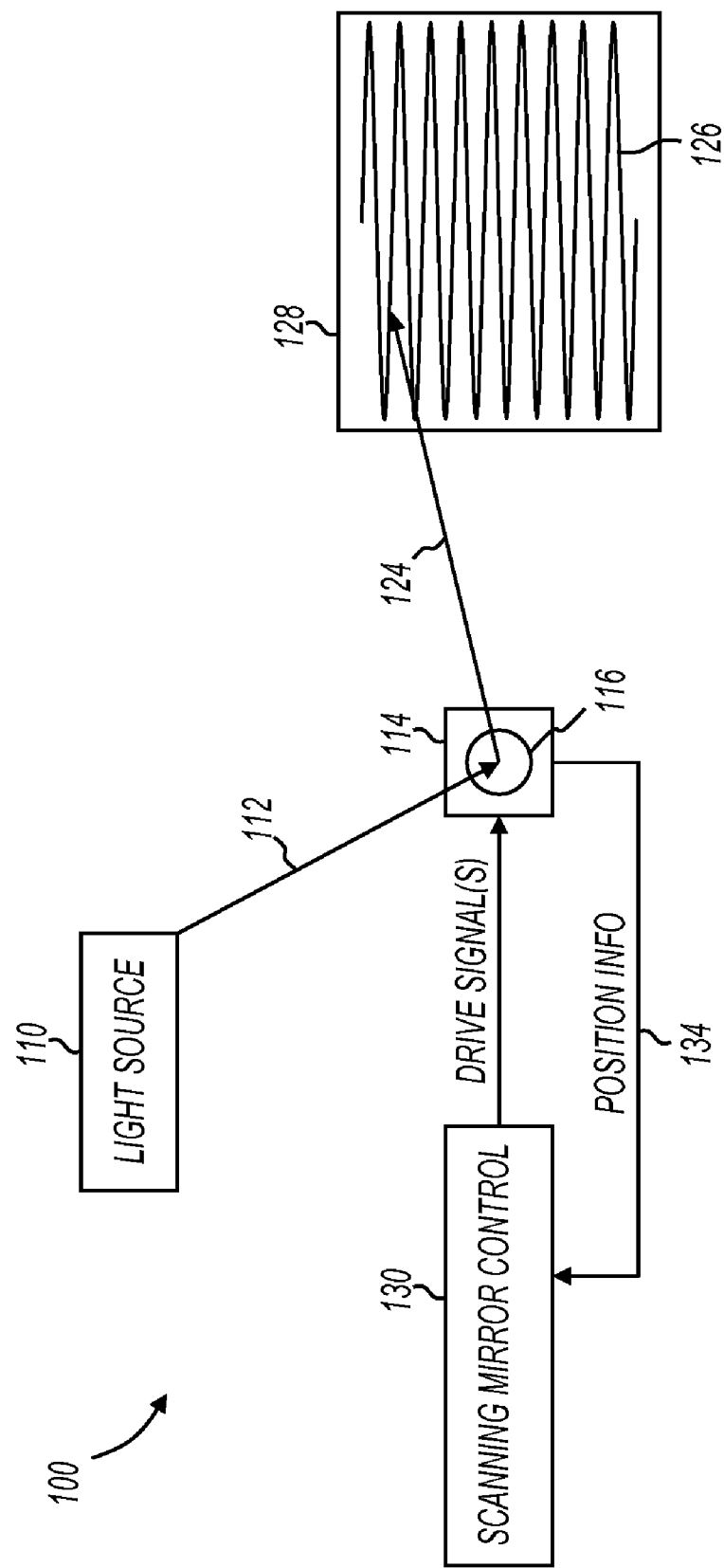
FIG. 1 shows a scanned beam projection system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanned beam projection system in accordance with various embodiments of the present invention. As shown in FIG. 1, scanned beam projection system 100 includes a light source 110, which may be a laser light source such as a laser diode or the like, capable of emitting a beam 112 which may be a laser beam. The beam 112 impinges on a scanning platform 114 which includes a microelectromechanical system (MEMS) based scanner or the like, and reflects off of scanning mirror 116 to generate a controlled output beam 124. A scanning mirror control circuit 130 provides one or more drive signal(s) to control the angular motion of scanning mirror 116 to cause output beam 124 to generate a raster scan 126 on a projection surface 128.

In some embodiments, raster scan 126 is formed by combining a sinusoidal component on the fast-scan axis (horizontal axis) and a sawtooth component on the slow-scan axis (vertical axis). In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the fast-scan sinusoidal pattern as the beam sweeps vertically top-to-bottom, but does not show the flyback from bottom-to-top.

Scanning mirror 116 is deflected according to signals provided by scanning mirror control circuit 130, and mirror position information is provided back to scanning mirror control circuit 130 at 134. The mirror position information may describe angular position in the vertical slow-scan direction, the horizontal fast-scan direction, or both. Scanning mirror control circuit 130 receives the position information, determines the appropriate drive signals, and drives scanning mirror 116.

Figure 2:
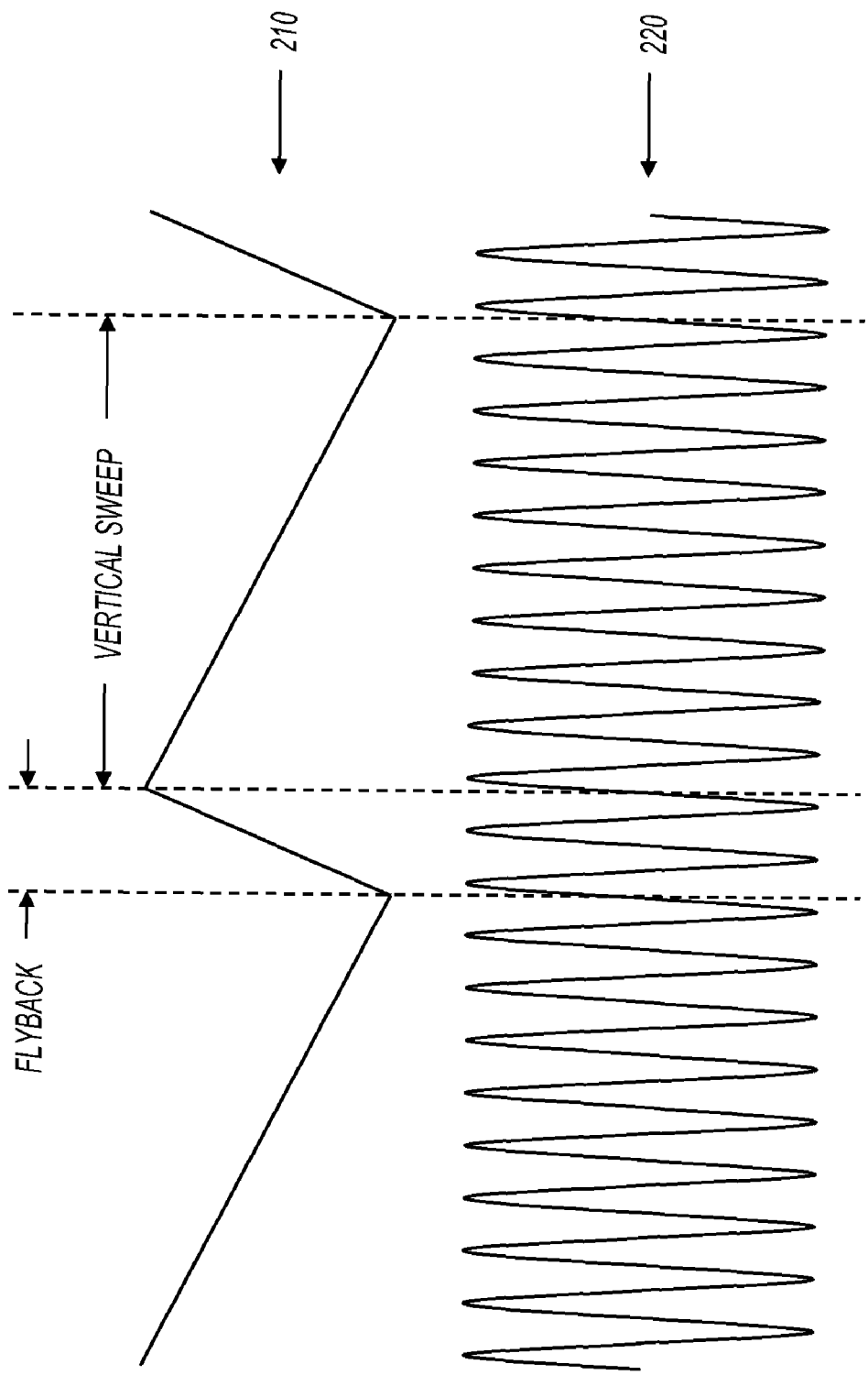
FIG. 2 shows beam deflection waveforms that result in the scan trajectory of FIG. 1.

FIG. 2 shows beam deflection waveforms that result in the raster scan trajectory of FIG. 1. Vertical deflection waveform 210 is a sawtooth waveform, and horizontal deflection waveform 220 is a sinusoidal waveform. The sawtooth vertical deflection waveform 210 includes a falling portion corresponding to the sweep of raster scan 126 from top-to-bottom, and also includes a rising portion corresponding to the flyback from bottom-to-top. After the flyback, the vertical sweep traverses substantially the same path on each trajectory.

It is important to note that the waveforms of FIG. 2 represent the desired mirror deflection as opposed to the drive signals provided to the scanning mirror. If the scanning mirror had a perfectly flat natural response with no resonance, scanning mirror control circuit 130 could drive signals 210 and 220 as shown. In actual implementations, scanning mirror 116 has resonant characteristics with multiple distinct vibration modes. Scanning mirror control circuit 130 modifies the drive signals in an attempt to cause the scanning mirror 116 to deflect according to the waveforms shown in FIG. 2 and thereby sweep controlled beam 124 to generate raster scan 126.

For ease of illustration, FIGS. 1 and 2 show a relatively small number of fast-scan cycles for each slow-scan cycle. In some embodiments, a significantly larger number of fast-scan cycles exist for each slow-scan cycle. For example, the slow-scan sweep may operate near 60 Hz and the fast-scan sweep may operate upwards of 18 kHz. One skilled in the art will appreciate that the various embodiments of the present invention may be advantageously applied to any scanning system regardless of the relationship between slow and fast-scan frequencies.

Although FIGS. 1 and 2 show a sawtooth waveform for the slow-scan deflection, the various embodiments of the invention are not so limited. For example, the slow-scan deflection waveform may be triangular, limited harmonic sinusoidal, or any other shape, without departing from the scope of the present invention.

Figure 3:
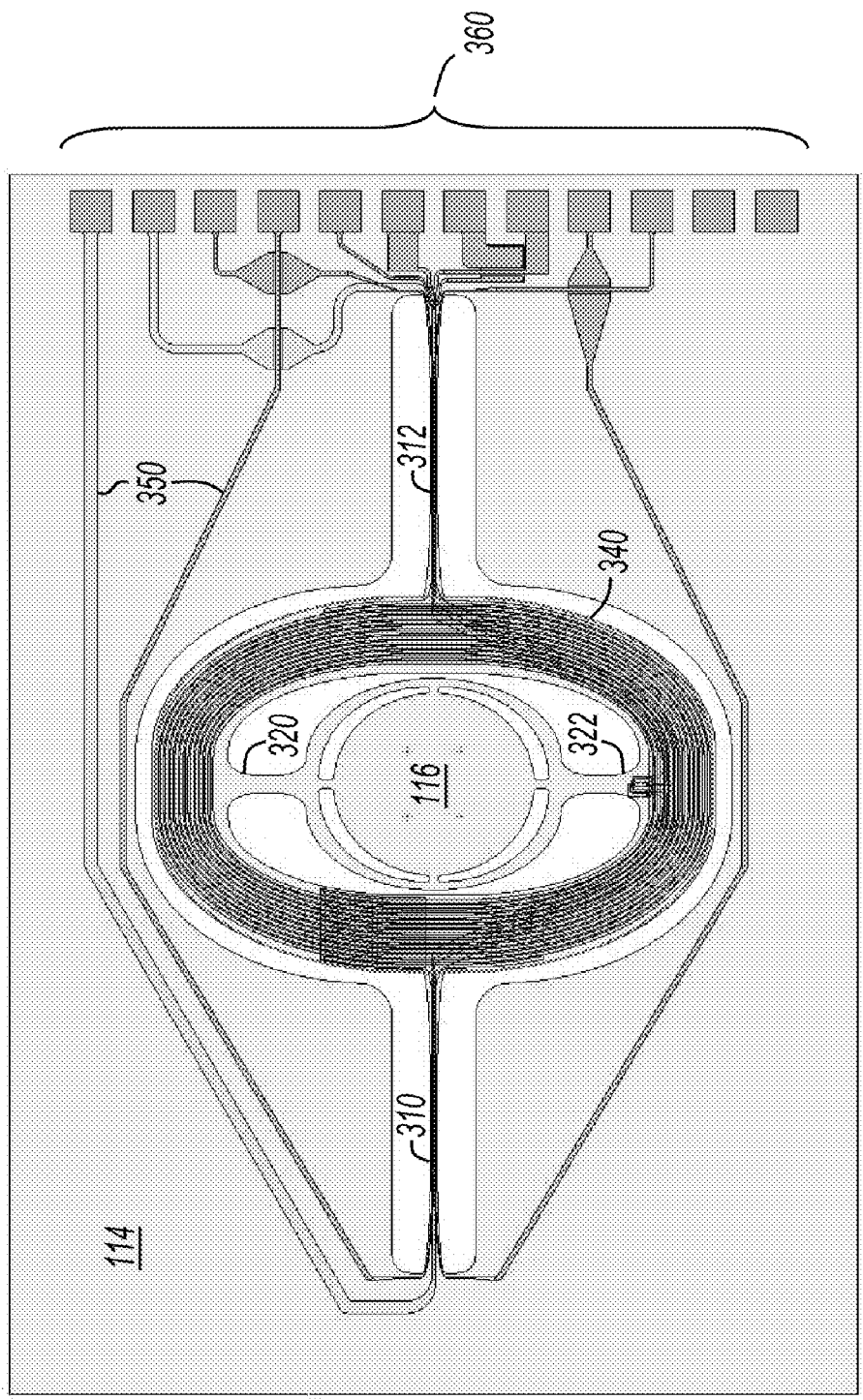
FIG. 3 shows a plan view of a scanning platform with a microelectromechanical system (MEMS) scanning mirror.

FIG. 3 shows a plan view of a scanning platform with a microelectromechanical system (MEMS) scanning mirror. Scanning platform 114 includes gimbal 340 and scanning mirror 116. Gimbal 340 is coupled to scanning platform 114 by flexures 310 and 312, and scanning mirror 116 is coupled to gimbal 340 by flexures 320 and 322. Gimbal 340 has a drive coil connected to drive lines 350. Current driven into drive lines 350 produces a current in the drive coil. Scanning platform 114 also incorporates one or more integrated piezoresistive position sensors. In some embodiments, scanning platform 114 includes one position sensor for each axis. Two of the interconnects 360 are coupled to drive lines 350. The remaining interconnects provide for the integrated position sensors for each axis.

In operation, an external magnetic field source (not shown) imposes a magnetic field on the drive coil. The magnetic field imposed on the drive coil by the external magnetic field source has a component in the plane of the coil, and is oriented at roughly 45° with respect to the two drive axes. The in-plane current in the coil windings interacts with the in-plane magnetic field to produce out-of-plane Lorentz forces on the conductors. Since the drive current forms a loop on gimbal 340, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The frequency components of the applied torque are selected to excite the horizontal mirror resonance (~18 kHz) and to provide a ramp drive for the vertical mirror motion (60 Hz, 120 Hz, 180 Hz . . . ). The frequency response characteristics of mirror 116 and gimbal 340 act to separate the torque components into their respective motions.

Figure 4:
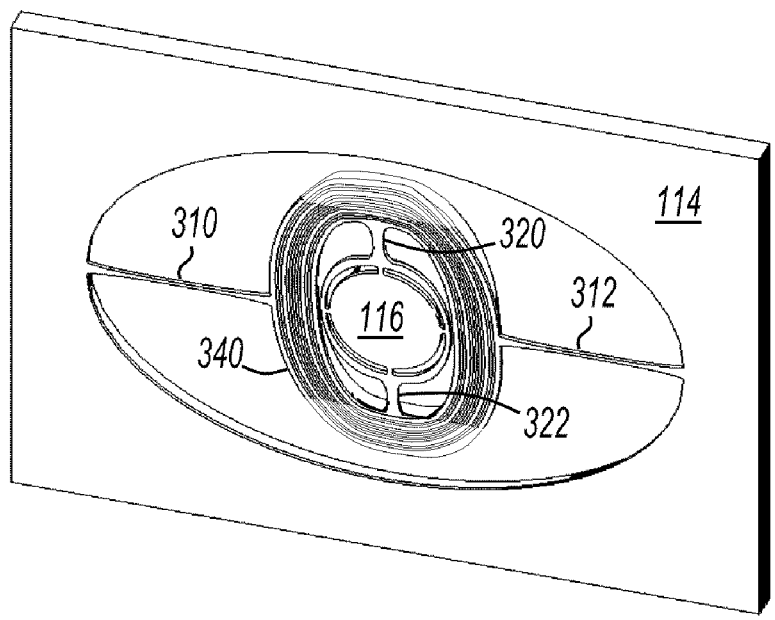
FIGS. 4 and 5 show two vibration modes of the MEMS scanning mirror of FIG. 3.
Figure 5:
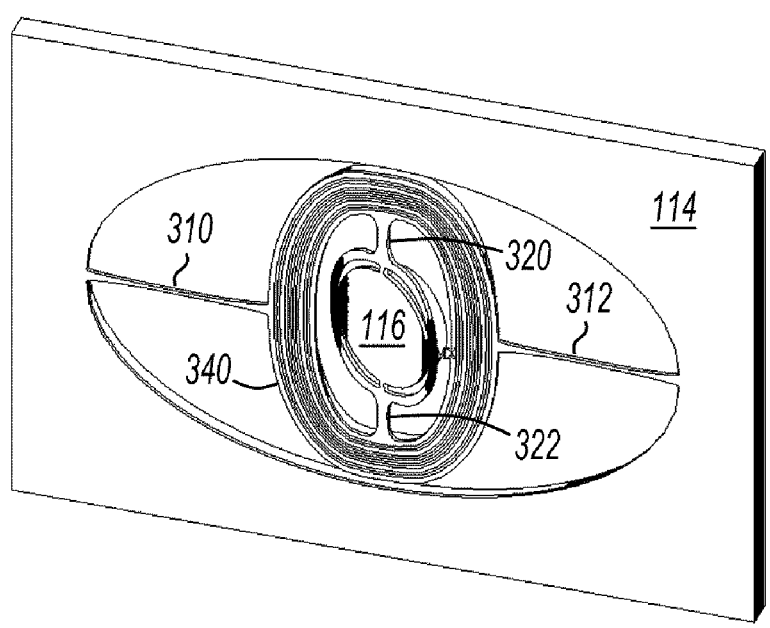

Two resonant vibration modes of the scanner are shown in FIGS. 4 and 5. The first mode, shown in FIG. 4, is a vertical resonant mode of the entire gimbaled structure, and the second mode, shown in FIG. 5, is a horizontal resonant mode of scanning mirror 116. In the vertical resonant mode shown in FIG. 4, gimbal 340 rotates on flexures 310 and 312; and in the horizontal resonant mode shown in FIG. 5, mirror 116 rotates on flexures 320 and 322. Many other vibration modes may exist, but these two show the desirable angular movement on the two axes.

The frequencies of the various resonant modes may vary based on selected design criteria. For example, the frequency of the resonant mode shown in FIG. 5 may be increased or decreased by modifying the inertial mass of scanning mirror 116, or by varying properties of flexures 310 and 312. Likewise, the frequency of the resonant mode shown in FIG. 4 may be increased or decreased by modifying the properties of flexures 320 and 322, or by modifying the inertial mass of gimbal 340 and scanning mirror 116. An example MEMS mirror with different resonant characteristics is described in Randall B. Sprague et al., *Bi-axial Magnetic Drive for Scanned Beam Display Mirrors*, Proc. SPIE, Vol. 5721, 1 (Jan. 24, 2005); DOI:10.1117/12.596942 Online Publication Date: 28 Feb. 2005. One skilled in art will appreciate that any scanning mirror with any resonant properties may be utilized with the various embodiments of the present invention.

The scanning mirror shown in FIGS. 3-5 are an example of a "coil driven mirror", and more specifically, a "moving coil" design, because the coil moves in the presence of a magnetic field. In other embodiments, the mirror has one or more fixed magnets attached thereto, and the coil is stationary. In still further embodiments, other types of drive mechanisms are utilized (e.g., capacitively driven MEMS mirrors). The type of drive mechanism used to cause mirror motion is not a limitation of the present invention.

Figure 6:
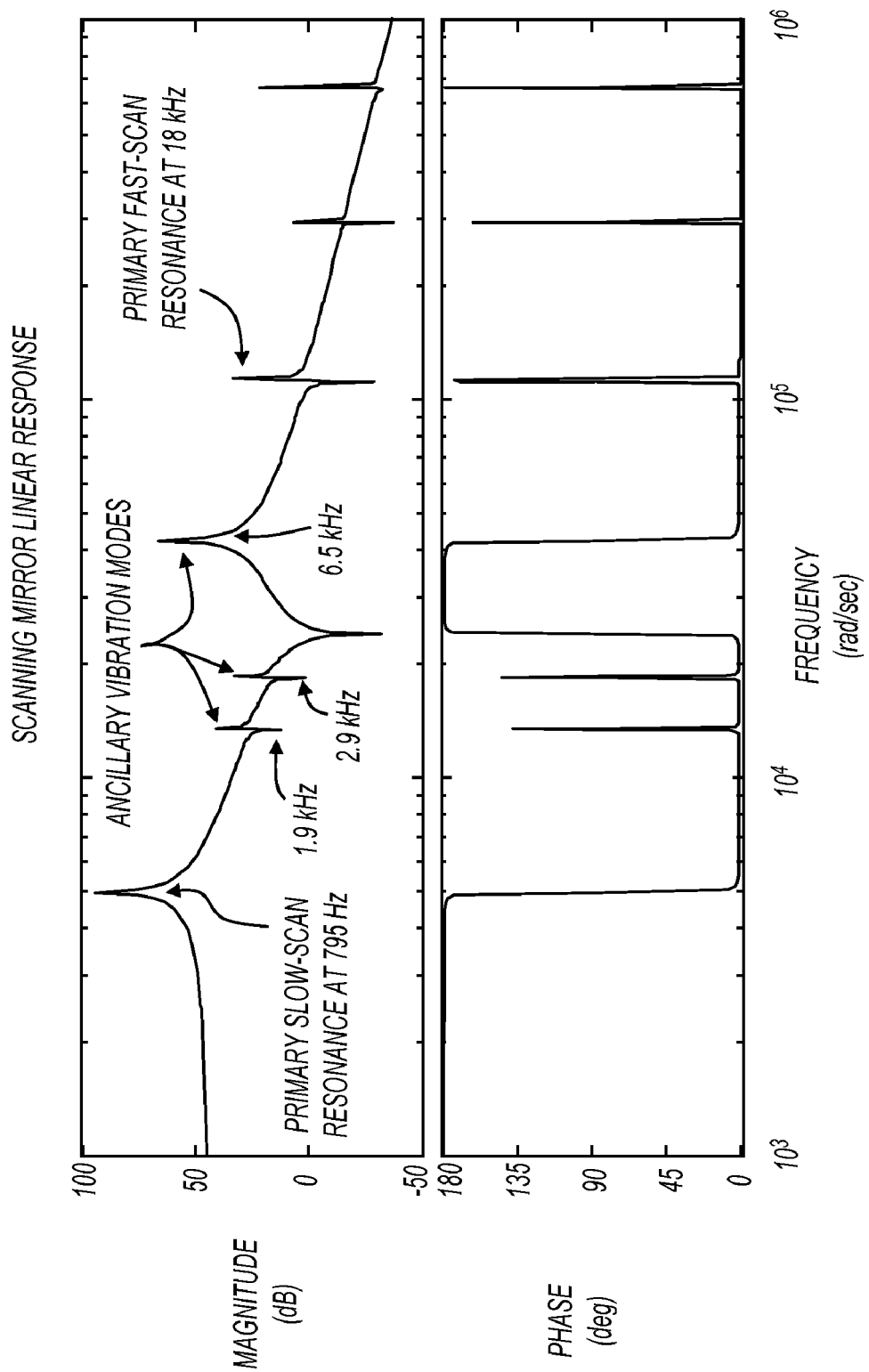
FIG. 6 shows a linear response of the MEMS scanning mirror of FIG. 3.

FIG. 6 shows a linear response of the MEMS scanning mirror of FIG. 3. The scanning mirror exhibits a primary slow-scan resonance at 795 Hz and a primary fast-scan resonance at 18 kHz. The primary slow-scan resonance at 795 Hz causes the gimbal 340 to oscillate in the slow-scan (vertical) direction as shown in FIG. 4. The primary fast-scan resonance at 18 kHz causes the scanning mirror to oscillate in the fast-scan (horizontal) direction as shown in FIG. 5. The ancillary vibration modes at 1.9 kHz, 2.9 kHz, and 6.5 kHz produce combinations of horizontal/vertical movements that are generally undesirable.

The various resonant vibration modes pose challenges to the scanning mirror control circuit 130. For example, in order to produce the ramp waveform 210 (FIG. 2), the scanning mirror control circuit may drive harmonics of 60 Hz (60 Hz, 120 Hz, 180 Hz, . . . ) out past the resonance at 795 Hz. The mechanical gain exhibited by the mirror at 795 Hz causes vibration at some harmonics to be accentuated, thereby distorting the ramp.

Various embodiments of the present invention provide a feedback loop that modifies the scanning mirror drive signals to produce the desired scanning mirror behavior in the presence of high mechanical gain and non-linear characteristics that produce additional motion distortion. In some embodiments, the amplitude and phase of each of the harmonic drive signals is modified in response to the measured behavior of the mirror. Further, each harmonic signal may be modified at a different rate (the "learning rate"). For example, harmonic signals in regions of high mechanical gain may be modified more slowly (have lower learning rates) than harmonic signals in regions of low mechanical gain.

Figure 7:
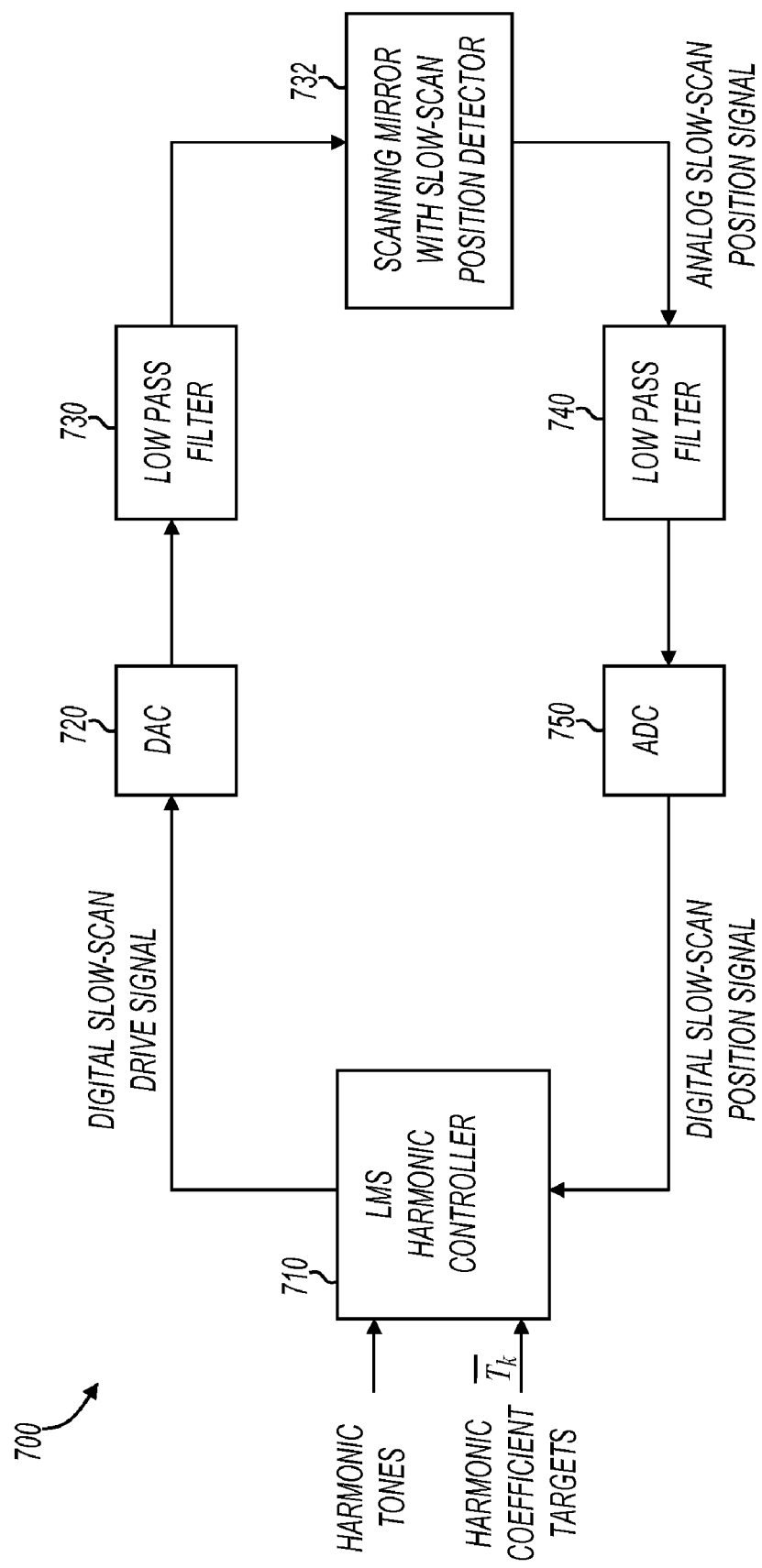
FIG. 7 shows a scanning mirror slow-scan control loop with a Least Mean Square (LMS) harmonic controller.

FIG. 7 shows a scanning mirror slow-scan control loop with a Least Mean Square (LMS) harmonic controller. Slow-scan control loop 700 includes LMS harmonic controller 710, digital-to-analog converter (DAC) 720, low pass filters 730 and 740, scanning mirror 732, and analog-to-digital converter (ADC) 750. Scanning mirror 732 may be any scanning mirror, including the examples described above with reference to FIG. 3.

In operation, LMS harmonic controller 710 generates and sums digital harmonically related time domain signals to create the digital slow-scan drive signal. The digital slow-scan drive signal is converted to an analog signal by DAC 720 and low pass filtered at 730. The resulting analog slow-scan drive signal drives scanning mirror 732.

Scanning mirror 732 includes position detectors in the slow-scan direction. These sensors provide a signal that corresponds to the actual angular displacement of the mirror in the slow-scan direction. The analog slow-scan position signal is provided from the sensors to low pass filter 740. Low pass filter 740 may have any suitable cut-off frequency. For example, when scanning mirror 732 has a response similar to that shown in FIG. 6, the filter cut-off frequency may be on the order of a few kHz to remove any signal energy resulting from the higher frequency vibration modes of the mirror.

The low pass filtered slow-scan position signal is converted to digital form by ADC 750, and the resulting digital slow-scan position signal is provided to LMS harmonic controller 710. LMS harmonic controller 710 receives harmonic tones and harmonic coefficient targets. The harmonic coefficient targets are represented as $$T_k = T_R + iT_I, \qquad (3)$$

where k is the harmonic number, $T_k$ is complex, $T_R$ is real, and $iT_I$ is imaginary. LMS harmonic controller 710 produces a drive signal as a sum of the harmonic tones with coefficients that approach the values of $T_k$.

Figure 8:
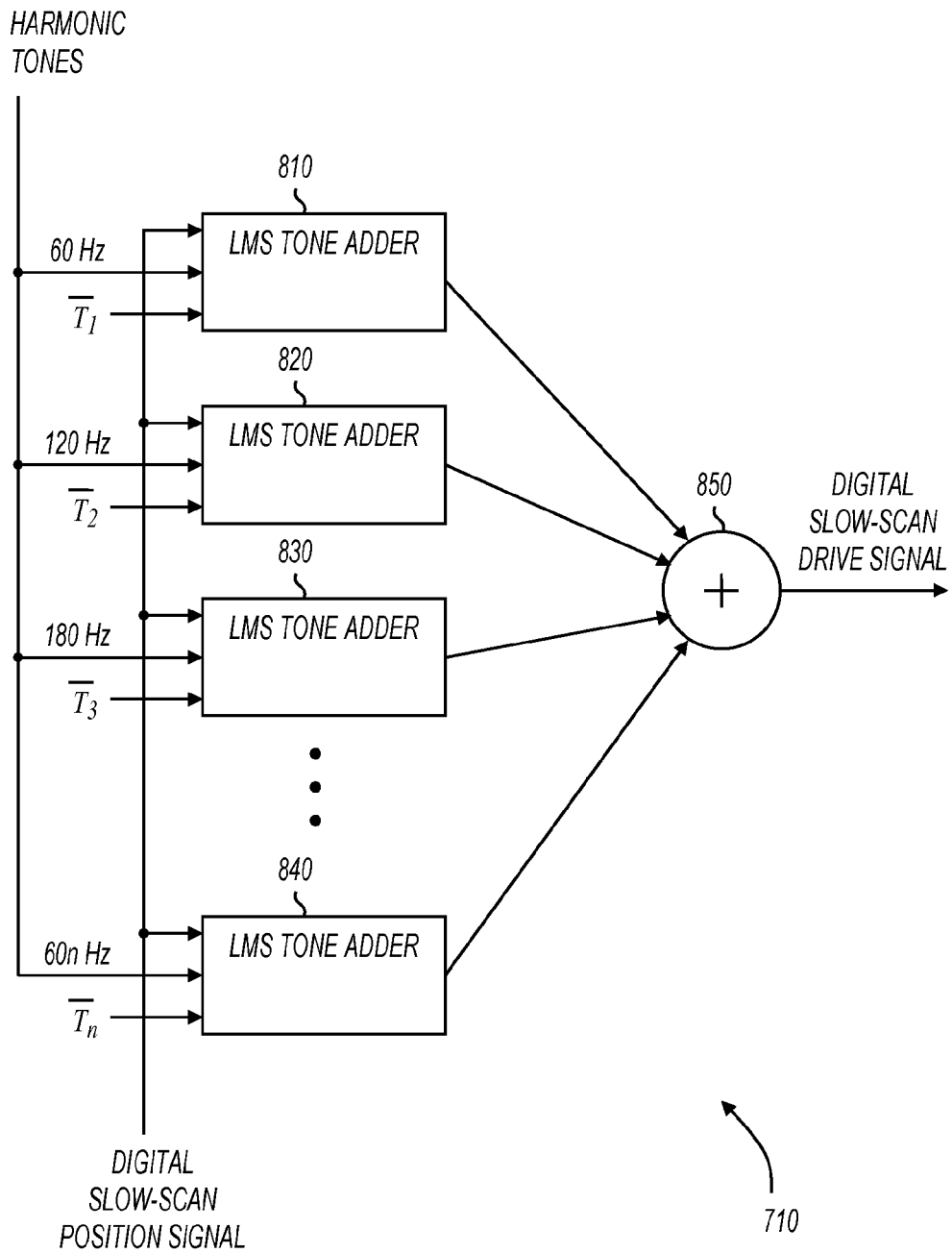
FIG. 8 shows an LMS harmonic controller.

FIG. 8 shows an LMS harmonic controller. LMS harmonic controller 710 includes LMS tone adders 810, 820, 830, and 840, corresponding to one tone adder for each of n tones to be summed. LMS tone adder 810 (the first tone adder) receives a 60 Hz tone, the corresponding coefficient $T_1$, and the digital slow-scan position signal. LMS tone adder 820 (the second tone adder) receives a 120 Hz tone, the corresponding coefficient $T_2$, and the digital slow-scan position signal. LMS tone adder 830 (the third tone adder) receives a 180 Hz tone, the corresponding coefficient $T_3$, and the digital slow-scan position signal. LMS tone adder 840 (the $n^{th}$ tone adder) receives a 60 n Hz tone, the corresponding coefficient $T_n$, and the digital slow-scan position signal. Summer 850 sums the harmonically related signals generated by the tone adders, and produces the digital slow-scan drive signal.

In operation, each LMS tone adder compares a spectral component (harmonic of the fundamental) of the slow-scan position signal against a target. The number of tone adders is equal to the number of signal harmonics in the digital slow-scan drive signal. Any number of harmonics and any number of tone adders may be included without departing from the scope of the present invention. For example, in some embodiments, ten tone adders may be utilized, and the harmonics may range from 60 Hz to 600 Hz. In other embodiments, 17 tone adders may be utilized, and the harmonics may range from 60 Hz to 1.02 kHz. The number of harmonics utilized represents a tradeoff between drive signal fidelity and implementation complexity.

The example of FIG. 7 shows a fundamental frequency of 60 Hz and harmonics thereof, although the various embodiments of the invention are not so limited. For example, a sawtooth slow-scan deflection may have a fundamental frequency other than 60 Hz, in which case the harmonic tones will be at frequencies other than at multiples of 60 Hz. Also for example, the slow-scan trajectory may be any signal that may be constructed from a sum of sinusoids.

Figure 9:
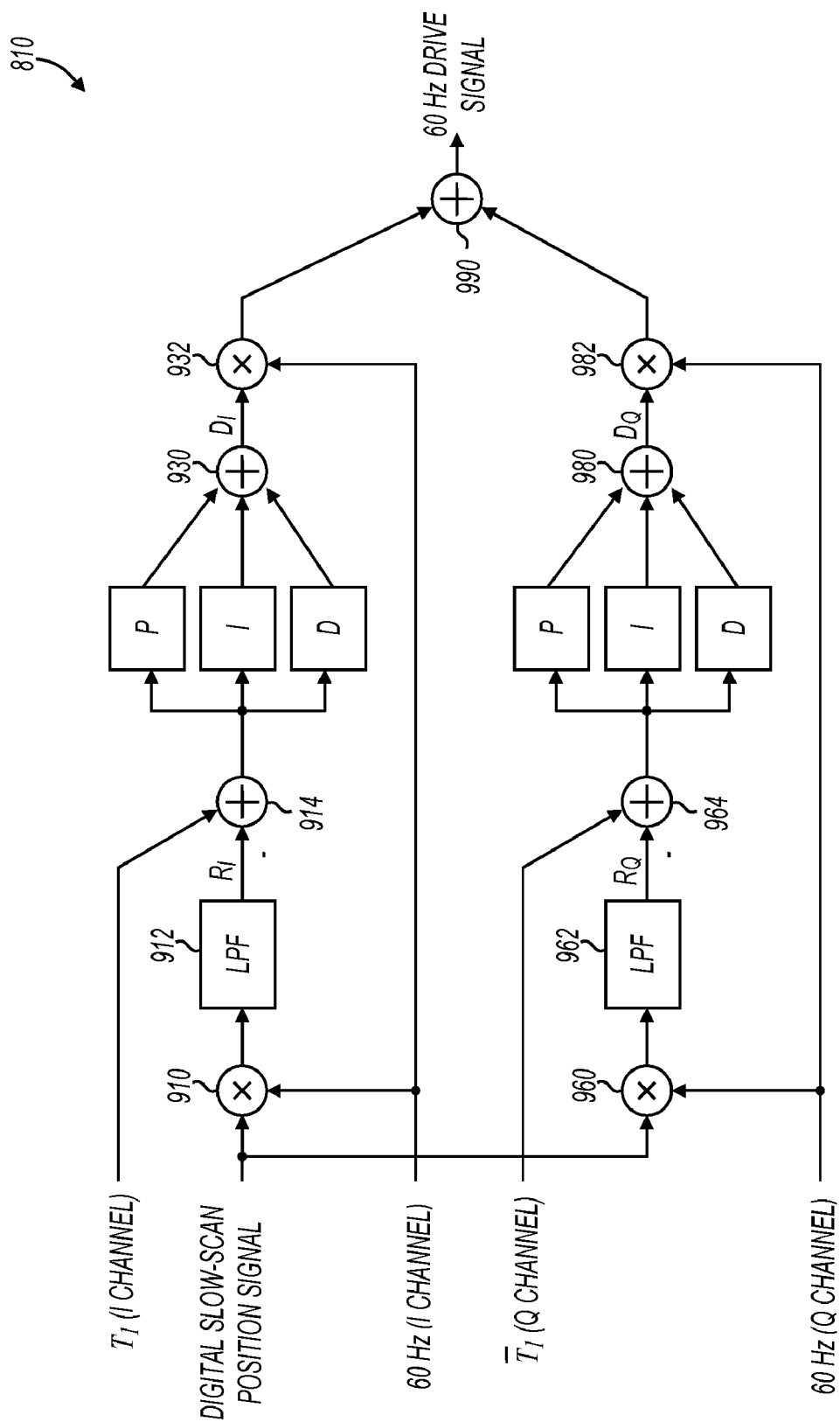
FIG. 9 shows an LMS tone adder.

FIG. 9 shows an LMS tone adder. LMS tone adder 810 includes in-phase and quadrature circuits to operate on complex signal samples. The in-phase circuit includes summers 914 and 930, multipliers 910 and 932, low pass filter (LPF) 912, and a proportional/integral/derivative (PID) controller that includes a proportional block (P), an integrator block (I), and a derivative block (D). The quadrature circuit includes summers 964 and 980, multipliers 960 and 982, low pass filter (LPF) 962, and a proportional/integral/derivative (PID) controller that includes a proportional block (P), an integrator block (I), and a derivative block (D). The outputs of the in-phase and quadrature channels are combined by summer 990 to create the harmonic output signal. FIG. 9 shows the first LMS tone adder of FIG. 8 (810). This tone adder receives a 60 Hz tone and the coefficient for the 60 Hz target, and produces the 60 Hz drive signal. Other LMS tone adders include identical functional blocks, but receive tones and targets for different harmonics.

In operation, multipliers 910 and 960 mix the slow-scan position signal with in-phase and quadrature components of a 60 Hz tone, translating the signal spectrum at 60 Hz to DC. Phase information is preserved through the quadrature operation. Low pass filters 912 and 962 remove spectral energy corresponding to harmonics other than 60 Hz. The DC output of filters 912 and 962 represents the harmonic coefficient $\overline{R}_k$ that is "returned" from the scanning mirror. The return harmonic coefficients are represented as $$\overline{R}_k = R_R + iR_I,$$

where k is the harmonic number, $\overline{R}_k$ is complex, $R_R$ is real, and $iR_I$ is imaginary. These DC values are compared (subtracted from) the target values, with the differences being the error signals which are applied to the PID controllers. The PID controllers operate to drive the in-phase and quadrature errors to zero. The output of the PID blocks are summed at 930 and 980 to form a complex harmonic drive coefficient represented as $$\overline{D}_k = D_R + iD_I,$$

where k is the harmonic number, $\overline{D}_k$ is complex, $D_R$ is real, and $iD_I$ is imaginary. The harmonic drive coefficient is mixed back up to 60 Hz by multipliers 932 and 982 to generate the in-phase and quadrature components of the 60 Hz drive signal, which are combined at 990.

In some embodiments, LMS tone adder 810 does not utilize the proportional blocks (P) or the derivative blocks (D). In these embodiments, the integrator blocks (I) integrate the error terms to arrive at the output signals.

Figure 10:
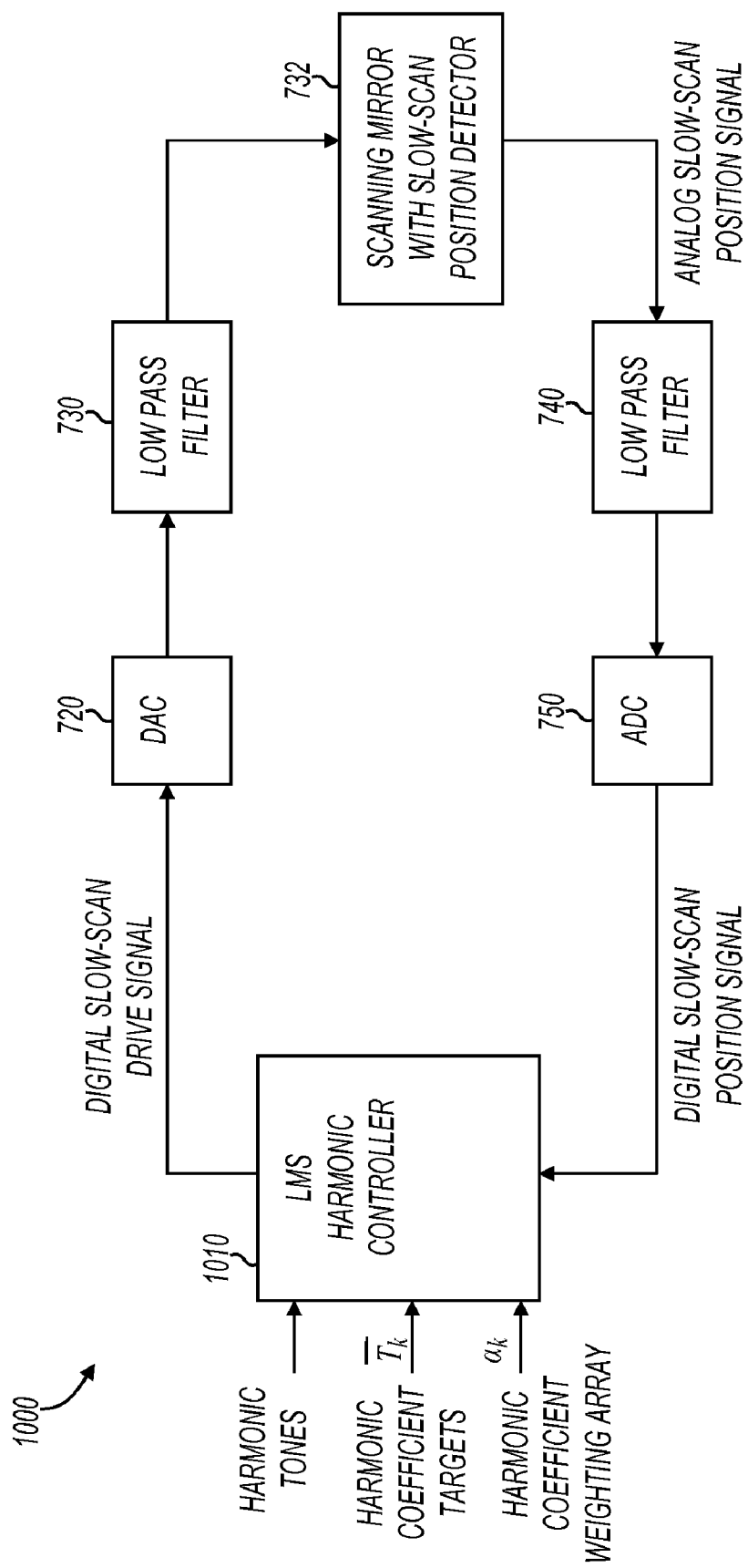
FIG. 10 shows a scanning mirror slow-scan control loop with an LMS harmonic controller using a harmonic coefficient weighting array.

FIG. 10 shows a scanning mirror slow-scan control loop with an LMS harmonic controller using a harmonic coefficient weighting array. Slow-scan control loop 1000 includes digital-to-analog converter (DAC) 720, low pass filters 730 and 740, scanning mirror 732, and analog-to-digital converter (ADC) 750, all of which are described above with respect to FIG. 7.

Slow-scan control loop 1000 also includes LMS harmonic controller 1010. Similar to LMS harmonic controller 710 in FIG. 7, LMS harmonic controller 1010 receives the digital slow-scan position signal and harmonic coefficient targets $T_k$, and produces a digital slow-scan drive signal. LMS harmonic controller 1010 differs from LMS harmonic controller 710, in that controller 1010 also receives a harmonic coefficient weighting array to provide different "learning rates" for each harmonic coefficient. Alpha, $\alpha_k$, is the weighting array that provides appropriate magnitude and phase scaling (vector direction) for successive reduction of the error quantity.

In some embodiments, the weighting array is the inverse of the mirror gain (transfer function) normalized to one at the primary frequency (60 Hz). One or more mirrors can be characterized, and the weighting array is determined from the measured transfer function. Alternatively, the linear transfer function of the mirror can be measured and learned at device startup or during operation of the device. For example, assume that a measured mirror gain (see FIG. 6) at 60 Hz intervals for 17 harmonics is as follows:

MirrorGain=[0.0562, 0.0595, 0.0630, 0.0653, 0.0668, 0.0724 0.0812, 0.0912, 0.1122, 0.1496, 0.2511, 1.0, 1.0, 0.2511 0.1412, 0.0944, 0.0668]

where the first entry of MirrorGain corresponds to the gain at 60 Hz and the last entry of Mirror Gain corresponds to the gain at 1.02 kHz. These are shown as real coefficients (magnitude only), but they can be complex values (magnitude and phase). The weighting array $\alpha_k$ (Alpha(k)) can be determined using the following algorithm:

$$Alpha'(k) = \frac{MirrorGain(k)}{MirrorGain(1)} \text{ // Normalize to the first harmonic}$$

$$\alpha_k = \frac{1}{Alpha'(k)} \text{ //}$$

Inverse of the linear gain at each discrete harmonic(frequency)

It should be noted that the Alpha weighting does not necessarily have to conform to the MEMS gain properties. The MEMS transfer function can be modified by a closed loop feedback system and the composite gain of the combined system can be used to compute $\alpha_k$ (Alpha(k)).

Figure 11:
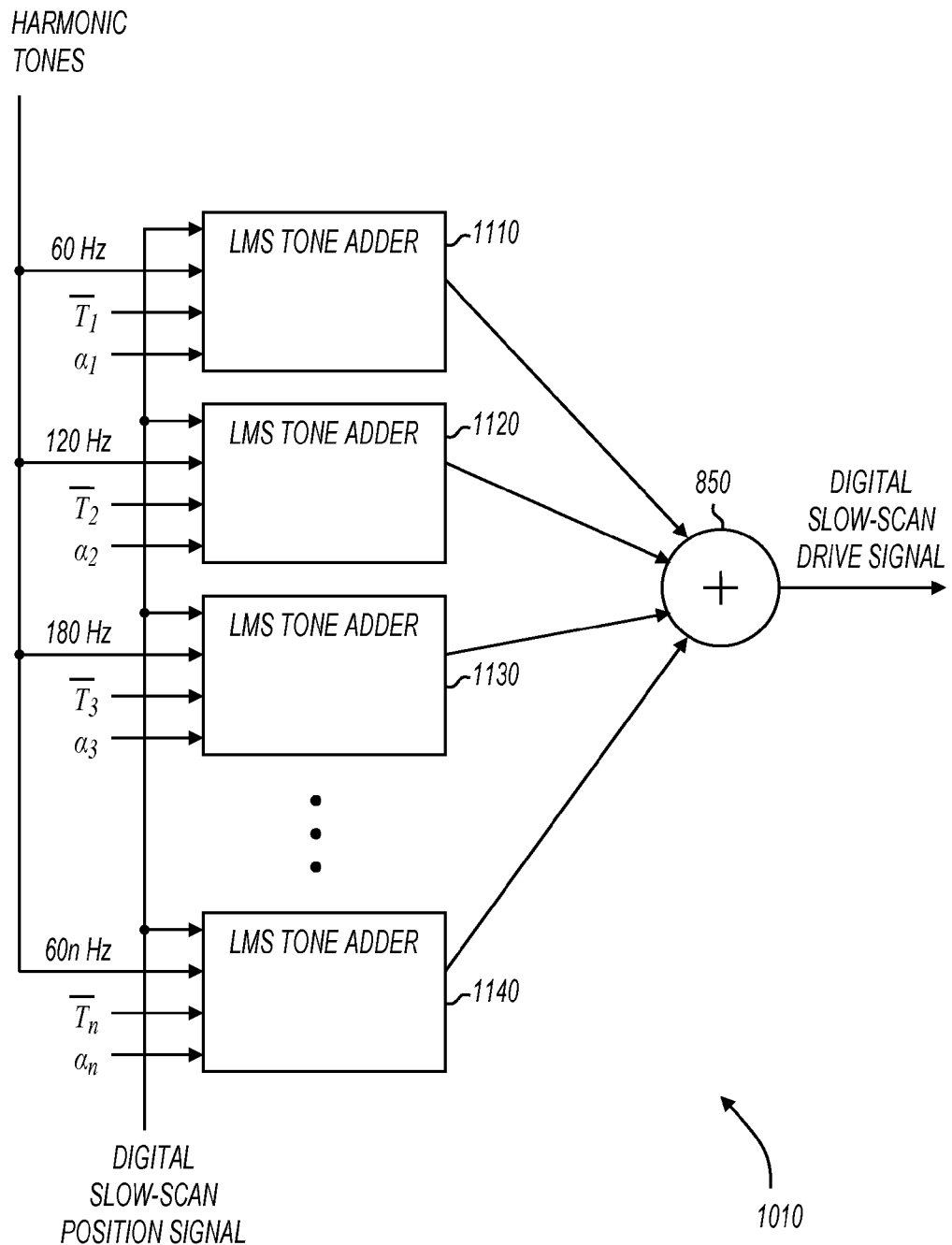
FIG. 11 shows an LMS harmonic controller using a harmonic coefficient weighting array.

FIG. 11 shows an LMS harmonic controller using a harmonic coefficient weighting array. LMS harmonic controller 1010 includes LMS tone adders 1110, 1120, 1130, and 1140, and summer 850. LMS tone adders 1110, 1120, 1130, and 1140 correspond to the LMS tone adders of FIG. 8 except that LMS tone adders 1110, 1120, 1130, and 1140 receive the harmonic coefficient weighting array.

Figure 12:
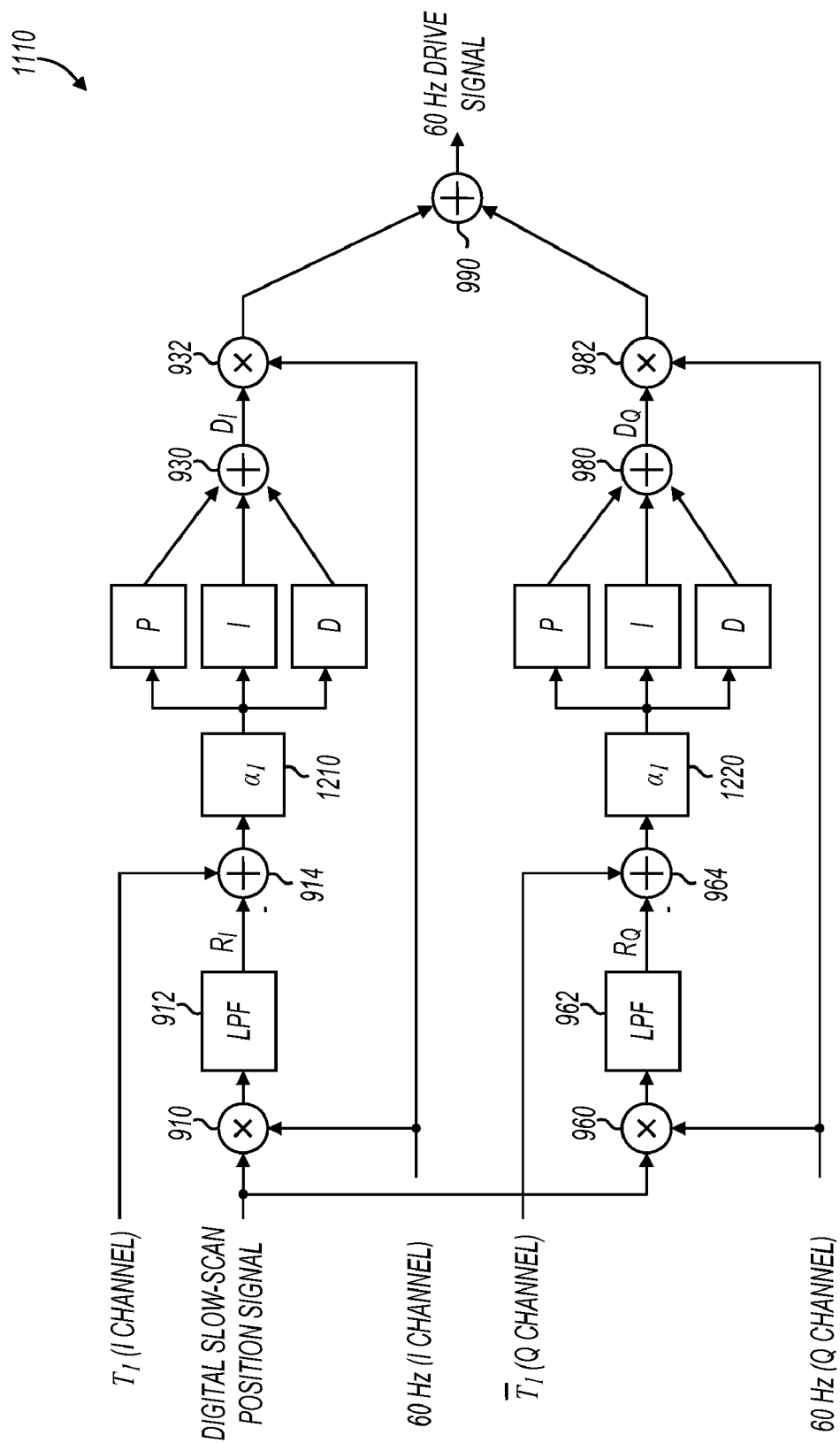
FIG. 12 shows an LMS tone adder using harmonic coefficient weighting.

FIG. 12 shows an LMS tone adder using harmonic coefficient weighting. LMS tone adder 1110 includes all of the components shown in FIG. 9. In addition, LMS tone adder 110 shows coefficient weighting blocks 1210 and 1220. Coefficient weighting blocks 1210 and 1220 provide scaling to the error signal, thereby allowing each LMS tone adder to have a different learning rate for the corresponding drive coefficient.

The functional blocks shown in FIGS. 7-12 may be implemented in any manner without departing from the scope of the present invention. For example, any combination of hardware and/or software may be utilized, as well as any level of integration. In some embodiments, a complete hardware solution is implemented. For example, one or more application specific integrated circuits (ASIC) or field programmable gate arrays (FPGA) may implement most or all of the blocks shown.

Figure 13:
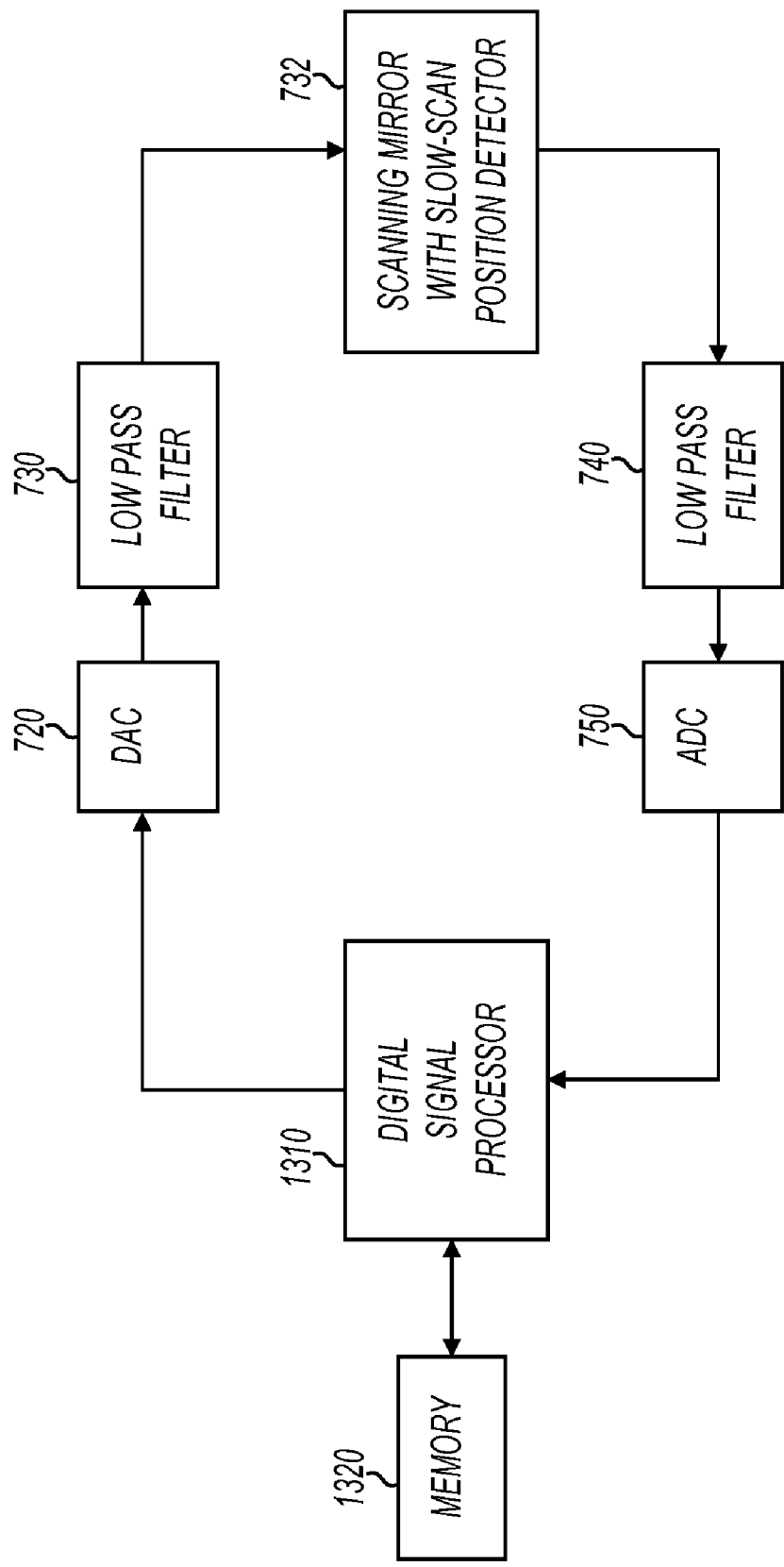
FIG. 13 shows a scanning mirror control loop that includes a digital signal processor.

In other embodiments, a processor executes instructions to perform the actions associated with FIGS. 7-12. For example, FIG. 13 shows a slow scan control loop that includes a digital signal processor (DSP). DSP 1310 may be any type of processor capable of performing the actions described herein. For example, DSP 1310 may be a commercially available processor or may be a custom processor. Further, DSP 1310 may be a standalone integrated circuit or may be a "core" that is included in an ASIC.

DSP 1310 receives digitized samples from ADC 750 and provides digital data for the ramp waveform to DAC 720. DSP 1310 performs the LMS harmonic control functions according to the embodiments shown in FIG. 7 or FIG. 10. Specifically, DSP 1310 may or may not use a fixed weighting array to provide different learning rates for each harmonic coefficient.

Memory 1320 is a computer-readable medium upon which instructions are stored. For example, memory 1320 may be a volatile memory such as static or dynamic random access memory (SRAM or DRAM) or may be non-volatile memory such as FLASH memory. In some embodiments, DSP 1310 and memory 1320 are included in a common integrated circuit such as an ASIC. Memory 1320 may also be a medium suitable for distribution such as disk (hard, soft, compact, or otherwise) or server with downloadable files.

DSP 1310 accesses instructions from memory 1320 and performs various method embodiments of the present invention. For example, any of the LMS harmonic control embodiments may be performed by DSP 1310. In addition, DSP 1310 may characterize the response of scanning mirror 732 as described above with reference to the MirrorGain array.

Figure 14:
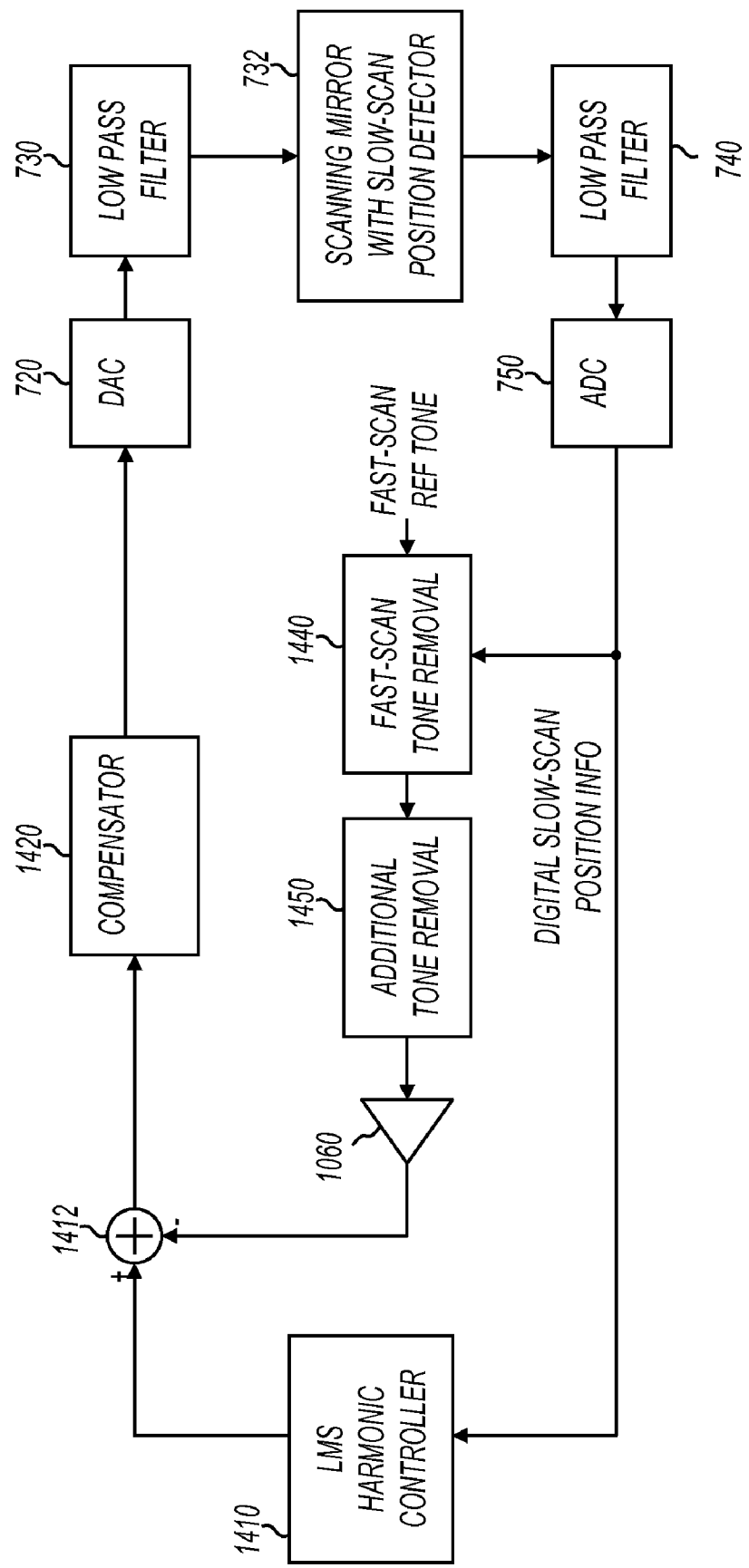
FIGS. 14 and 15 show scanning mirror slow-scan control systems that include two loops.

FIG. 14 shows a scanning mirror slow-scan control system that includes two loops. The system of FIG. 14 includes a low gain "inner loop" to modify the transfer function of the scanning mirror as seen by the "outer loop". The inner loop is formed by summer 1412, compensator 1420, DAC 720, low pass filters 730 and 740, scanning mirror 732, ADC 750, fast-scan tone removal block 1440, additional tone removal block 1450, and gain stage 1460. Compensator 1420 is included to compensate for scanning mirror transfer function gain and phase characteristics, and therefore modify the transfer function of the scanning mirror as seen by the outer loop. Compensator 1420 may take any form, including an analog or digital filter of arbitrary order. Example compensators are described further below. The inner loop can include any type of compensation circuit without departing from the scope of the present invention. The type and order of compensation circuits may be determined based at least in part on the transfer function of the scanning mirror. In some embodiments, compensator 1420 is implemented as an analog circuit, and DAC 720 precedes compensator 1420 in the signal path.

The outer loop is formed by summer 1412, compensator 1420, DAC 720, low pass filters 730 and 740, scanning mirror 732, ADC 750, and LMS harmonic controller 1410. LMS harmonic controller 1410 may be either LMS harmonic controller 710 (FIG. 7) or 1010 (FIG. 10). For example, in some embodiments, harmonic controller 1410 may or may not utilize a weighting array to modify learning rates of each harmonic component of the slow-scan drive signal.

Figure 15:
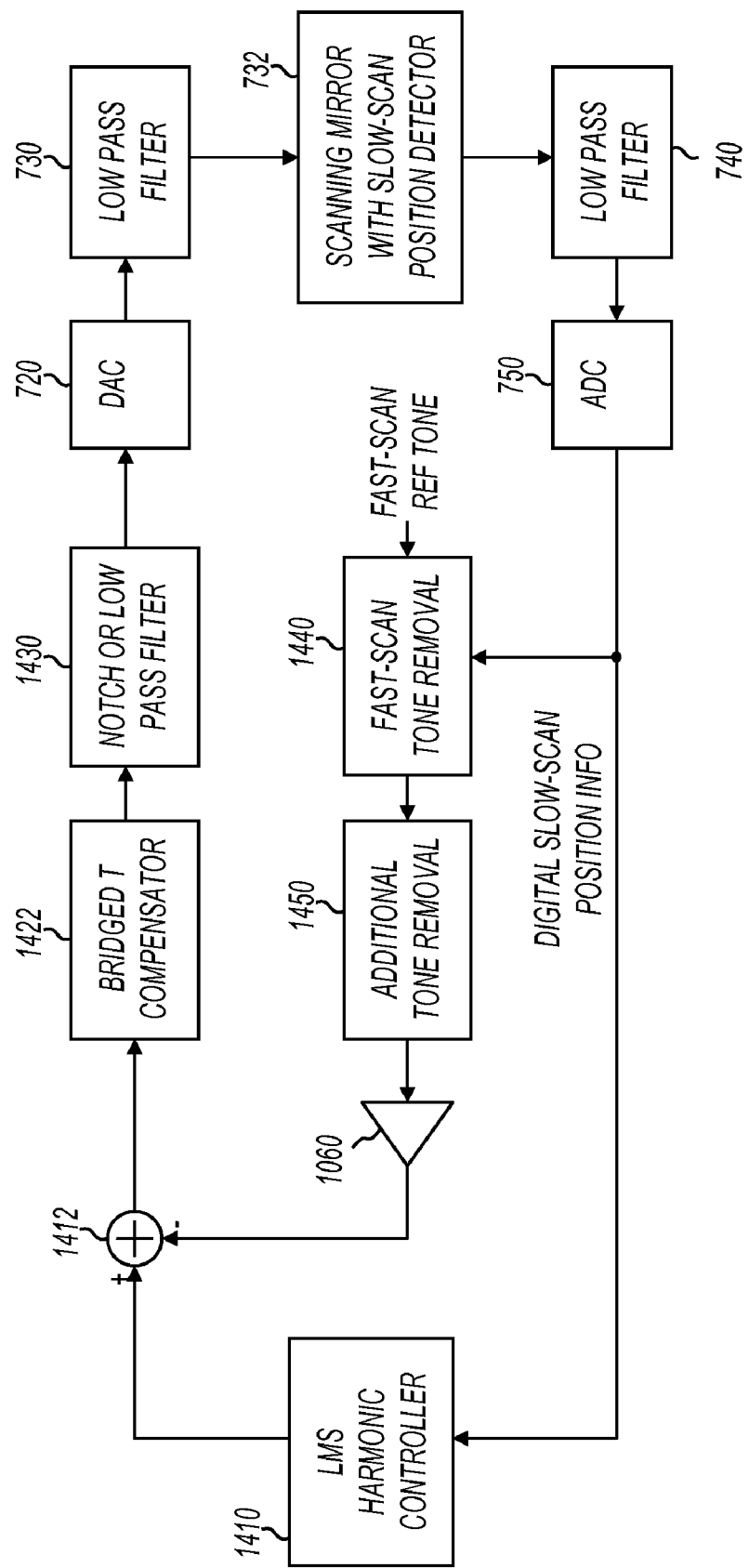

FIG. 15 shows a scanning mirror slow-scan control system that includes two loops. The control system of FIG. 15 shows a bridged-T compensator 1422 and filter 1430 in the place of compensator 1420 of FIG. 14. Bridged-T compensators are useful for eliminating instabilities in motion control systems caused by torsional resonance. See Gregory J. Schneider, *Taming Resonance in Servos*, Machine Design, (Feb. 7, 1985).

In various embodiments of the present invention, bridged-T compensator 1422 compensates for in-band mirror resonances that interfere with the slow-scan drive. For example, referring back to FIG. 6, the scanning mirror linear response shows a resonance at 795 Hz, which is within the frequency range of the harmonic drive signals. Bridged-T compensator 1422 is tuned to compensate for this in-band resonance, thereby reducing the gain variation that is handled by LMS harmonic controller 1410. Bridged-T compensator 1422 may be implemented as a finite impulse response (FIR) digital filter.

Figure 16:
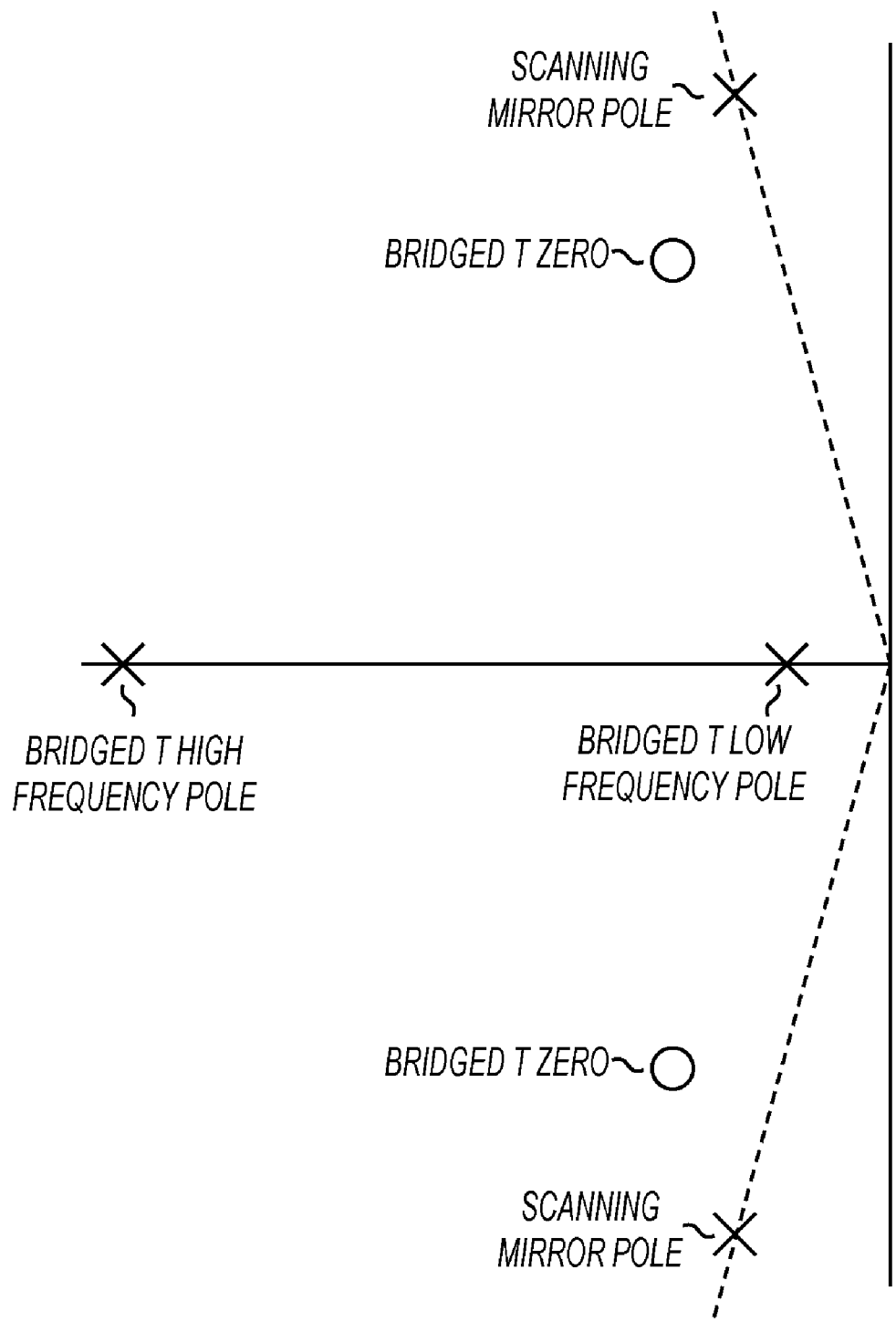
FIG. 16 shows a root locus plot showing the operation of a bridged-T compensator.

FIG. 16 shows a root locus plot showing the operation of bridged-T compensator 1420. The two scanning mirror poles cause the resonance shown at 795 Hz in FIG. 6. The bridged-T compensator provides two poles on the real axis, and two zeros to cancel the two scanning mirror poles. In some embodiments, the bridged-T zeros are superimposed directly on the scanning mirror poles, and in some embodiments, the bridged-T zeros are at the same angular offset as the scanning mirror poles. By placing the bridged-T zeros as shown in FIG. 16, phase margin is increased. The zeros are placed on a lower angle from the real axis as the mirror poles and at a smaller radius, resulting in both a lower Q and frequency for the zeros than for the mirror poles.

Referring now back to FIG. 15, a filter 1430 follows the bridged-T compensator in the signal path. Filter 1430 may be a notch filter or low pass filter that is tuned to remove spectral energy at a frequency of a resonant mode outside the frequency band occupied by the harmonic drive coefficients. For example, in some embodiments, filter 1430 may be a notch filter tuned to 6.5 kHz to filter out the 6.5 kHz ancillary vibration mode (FIG. 6). In other embodiments, filter 1430 may be a low pass filter having a cutoff frequency suitable to remove the unwanted spectral energy. Various scanning mirror designs may exhibit ancillary resonance at frequencies other than 6.5 kHz, and filter 1430 may also be tuned to remove spectral energy at these other frequencies.

Figure 17:
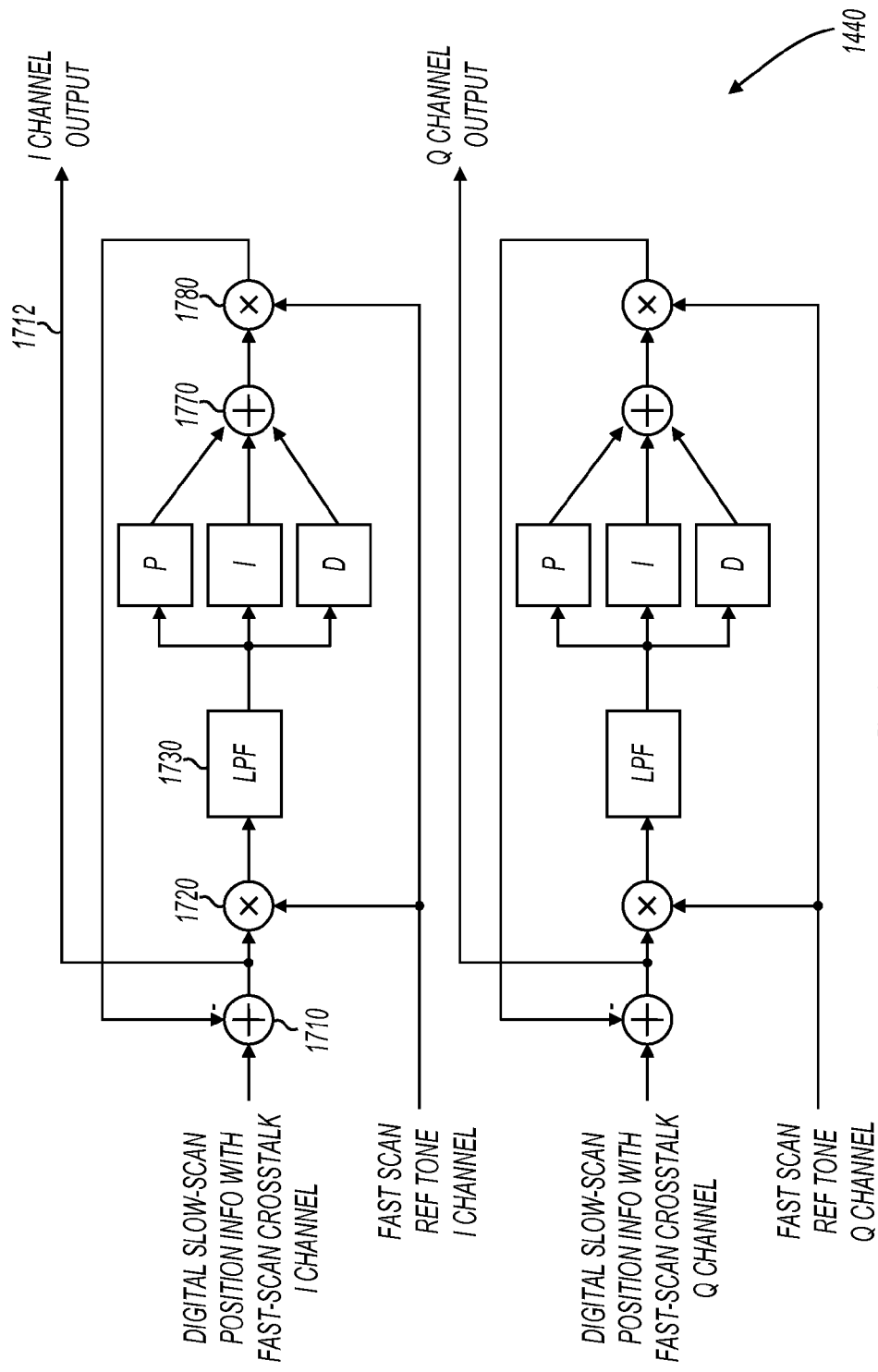
FIG. 17 shows a fast-scan tone removal block.

The inner loop also includes fast-scan tone removal block 1440. Fast-scan tone removal block 1440 removes spectral energy at the fast-scan frequency that results from unintentional electrical and/or mechanical crosstalk in the scanning mirror. Fast-scan tone removal block 1440 receives a copy of the fast-scan tone used to excite the scanning mirror on the fast scan axis. An example fast-scan tone removal block is shown in FIG. 17. FIG. 17 shows a least mean square (LMS) tone canceller that includes in-phase and quadrature circuits to operate on complex signal samples. The in-phase circuit includes summers 1710 and 1770, multipliers 1720 and 1780, low pass filter (LPF) 1730, and a proportional/integral/derivative (PID) controller that includes a proportional block (P), an integrator block (I), and a derivative block (D).

In operation, the output of multiplier 1780 regenerates the I-channel of the fast-scan crosstalk present on the input signal. The regenerated I-channel is subtracted from the input signal to produce the I-channel output at 1812. The I-channel output is mixed with the I-channel fast-scan reference tone by multiplier 1820, and the result is low pass filtered by LPF 1830. The DC output of LPF 1830 is the error term that represents the spectral content at the fast-scan frequency. The PID controller operates to drive this error to zero. The output of the PID blocks are summed at 1870, and the result is mixed back up to the fast-scan frequency by mixer 1880 to regenerate the I-channel of the fast-scan crosstalk present on the input signal. The Q channel circuit operates in the same fashion as the I-channel just described.

In some embodiments, fast-scan tone removal block 1440 does not utilize the proportional block (P) or the derivative block (D). In these embodiments, the integrator block (I) integrates the error term to arrive at the output that recreates the fast-scan tone spectral content.

Referring now back to FIG. 14, additional tone removal block 1450 may also perform tone removal for other tones. For example, tones resulting from the 1.9 kHz resonance (FIG. 6) may be removed by additional tone removal block 1450. In some embodiments, one or both of tone removal blocks 1440 and 1450 may include a notch filter or an LMS tone canceller. The LMS tone canceller imparts no phase delay and therefore preserves phase margin in the loop. Gain block 1460 provides gain to the inner feedback loop prior to combining the inner and outer loop data streams at 1412.

Figure 18:
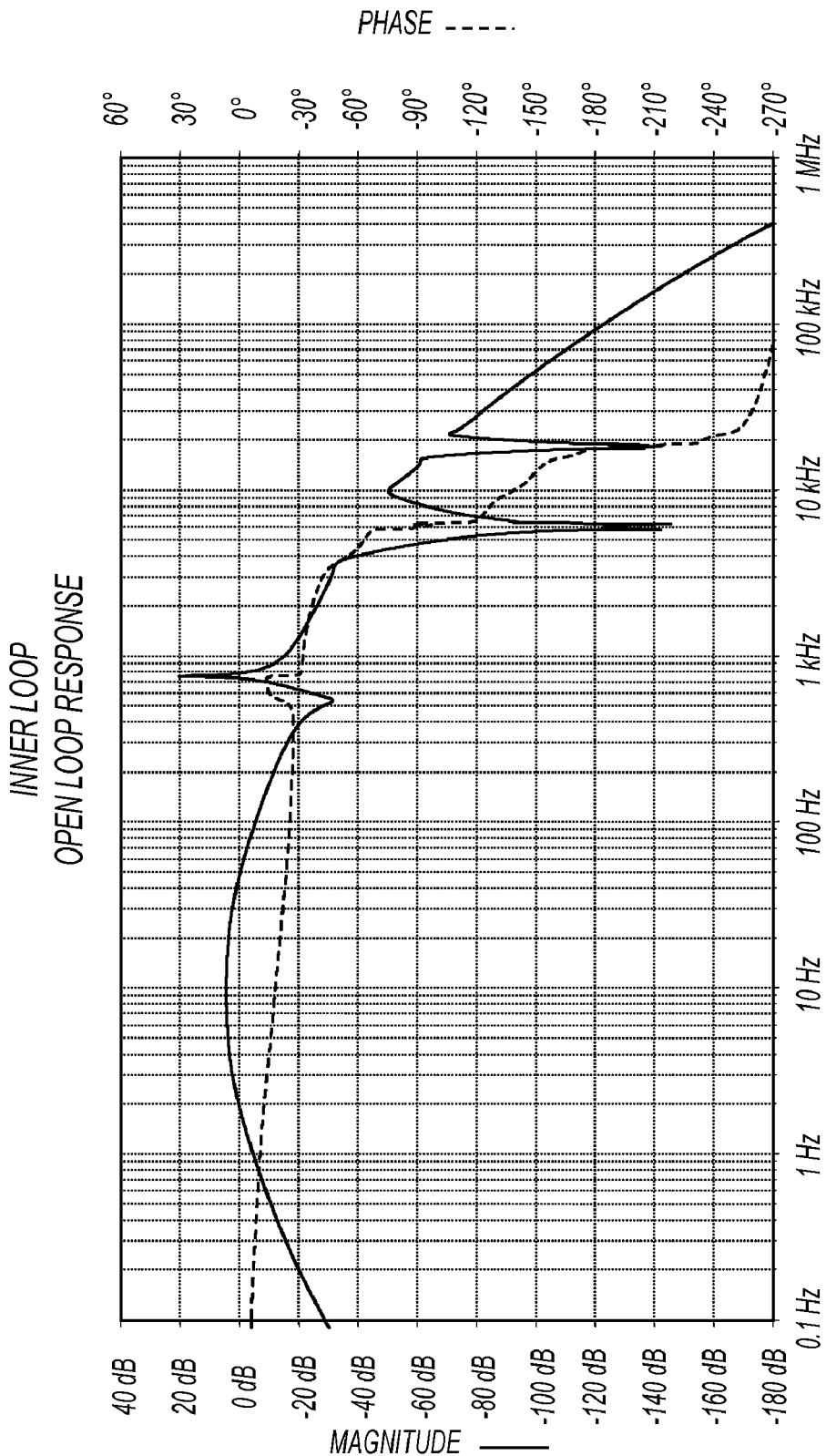
FIG. 18 shows the open loop response of the inner feedback loop of FIG. 10.
Figure 19:
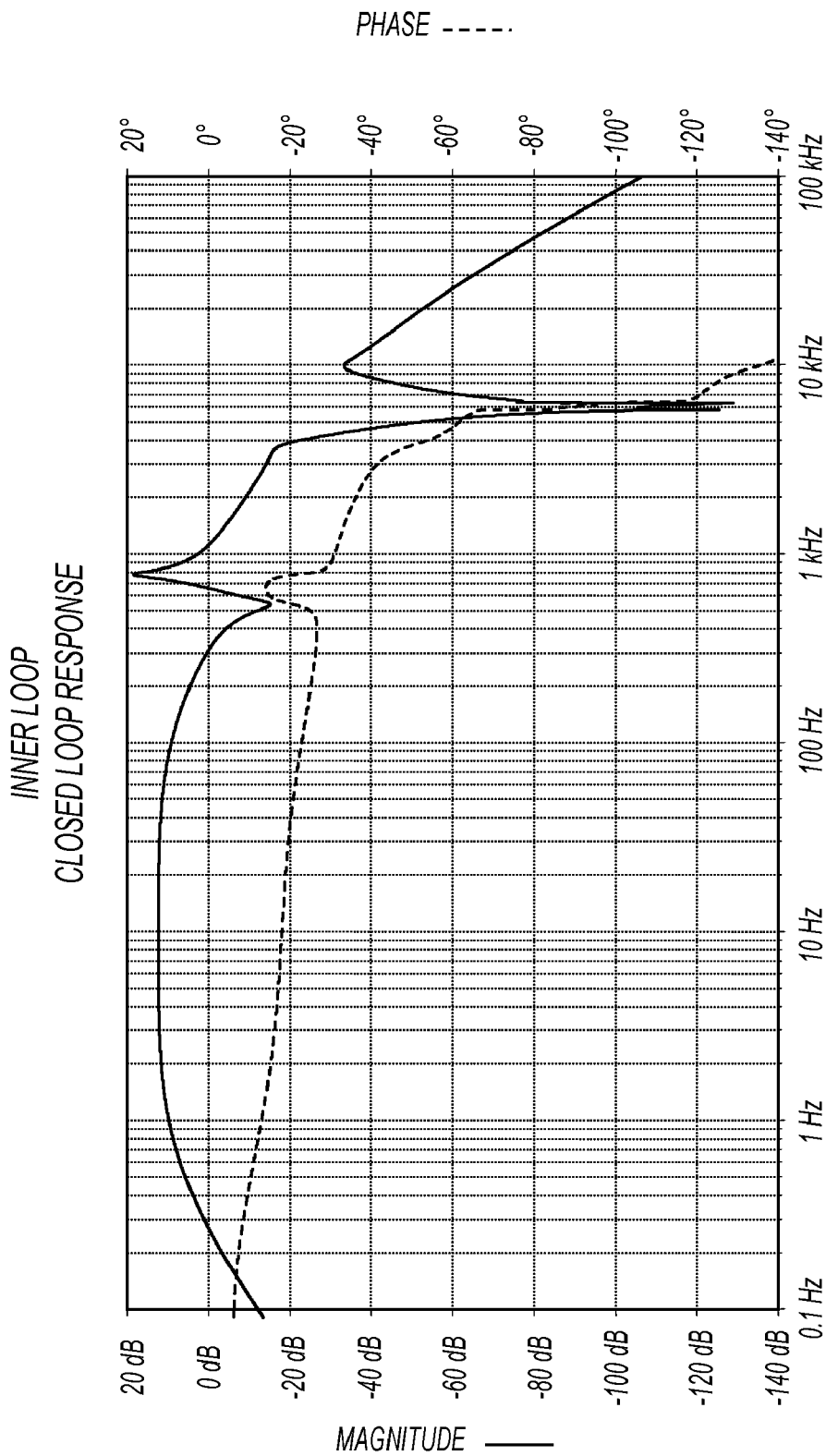
FIG. 19 shows the closed loop response of the inner feedback loop of FIG. 10.

FIGS. 18 and 19 show the open loop response and the closed loop response for the inner loop of FIG. 15. As shown in the figures, the bridged-T compensator modifies the closed loop response, thereby improving loop stability. This improvement in loop stability (i.e. phase margin) is what prevents the unwanted frequency components of the slow-scan from presenting themselves on the slow-scan drive signal. This phase improvement occurs because it eliminates the abrupt 180 degree phase transition of the imaginary scanning mirror poles at the slow-scan frequency and introduces the slowly varying phase response of the two real poles spread over a wider frequency range.

Figure 20:
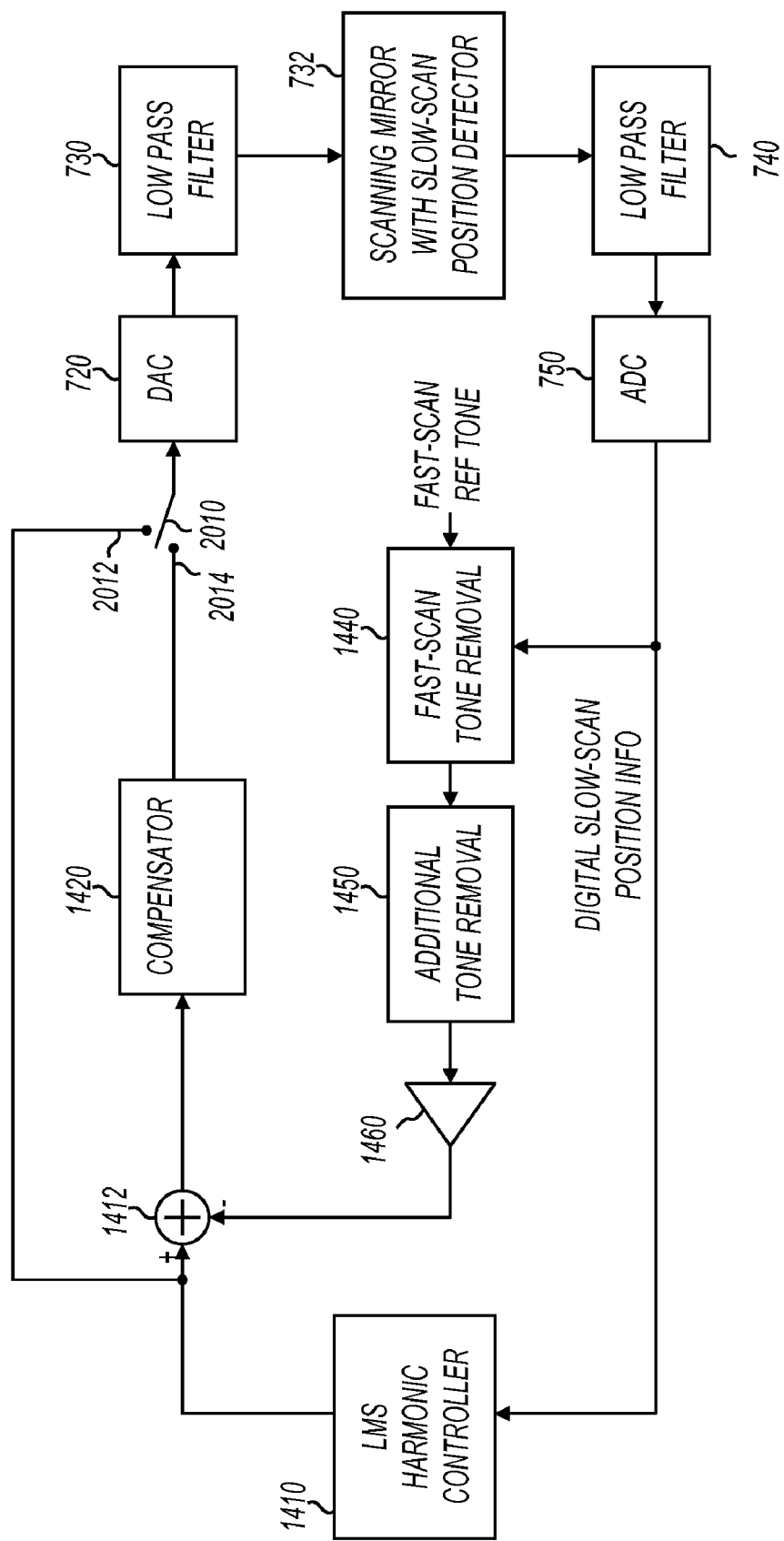
FIG. 20 shows a combination single/dual loop slow-scan control system.

FIG. 20 shows a combination single/dual loop slow-scan control system. The system shown in FIG. 20 includes everything shown in FIG. 14, and also includes a switch 2010. When switch 2010 is in position 2014, the system of FIG. 20 operates with two loops in the same manner as the system in FIG. 14. When switch 2010 is in position 2012, the inner loop is bypassed, and then the system of FIG. 20 operates with a single loop similar to those shown in FIGS. 7 and 10.

In some embodiments, the system of FIG. 20 may operate with one loop to characterize the scanning mirror, then operate with two loops while controlling movement of the scanning mirror. The system of FIG. 20 may also switch back and forth between the outer loop and two loops based on operating conditions.

Figure 21:
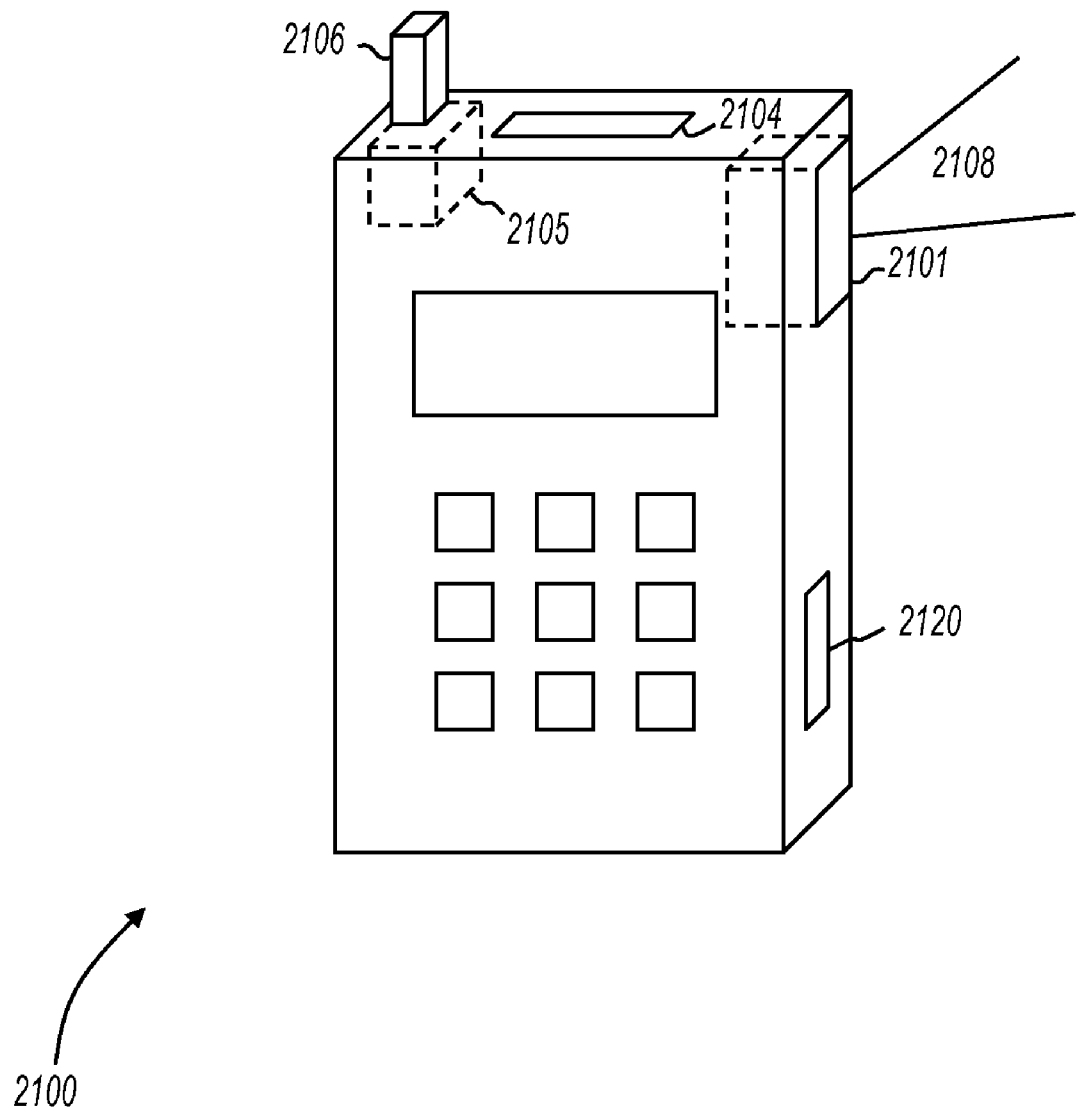
FIG. 21 shows a mobile device in accordance with various embodiments of the present invention.

FIG. 21 shows a mobile device in accordance with various embodiments of the present invention. Mobile device 2100 may be a hand held projection device with or without communications ability. For example, in some embodiments, mobile device 2100 may be a handheld projector with little or no other capabilities. Also for example, in some embodiments, mobile device 2100 may be a device usable for communications, including for example, a cellular phone, a smart phone, a personal digital assistant (PDA), a global positioning system (GPS) receiver, or the like. Further, mobile device 2100 may be connected to a larger network via a wireless (e.g., WiMax) or cellular connection, or this device can accept data messages or video content via an unregulated spectrum (e.g., WiFi) connection.

Mobile device 2100 includes scanning projection device 2101 to create an image with light 2108. Similar to other embodiments of projection systems described above, mobile device 2100 includes a projector with a scanning mirror and a slow-scan control system.

In some embodiments, mobile device 2100 includes antenna 2106 and electronic component 2105. In some embodiments, electronic component 2105 includes a receiver, and in other embodiments, electronic component 2105 includes a transceiver. For example, in GPS embodiments, electronic component 2105 may be a GPS receiver. In these embodiments, the image displayed by scanning projection device 2101 may be related to the position of the mobile device. Also for example, electronic component 2105 may be a transceiver suitable for two-way communications. In these embodiments, mobile device 2100 may be a cellular telephone, a two-way radio, a network interface card (NIC), or the like.

Mobile device 2100 also includes memory card slot 2104. In some embodiments, a memory card inserted in memory card slot 2104 may provide a source for video data to be displayed by scanning projection device 2101. Memory card slot 2104 may receive any type of solid state memory device, including for example, Multimedia Memory Cards (MMCs), Memory Stick DUOs, secure digital (SD) memory cards, and Smart Media cards. The foregoing list is meant to be exemplary, and not exhaustive.

Mobile device 2100 also includes data connector 2120. In some embodiments, data connector 2120 can be connected to one or more cables to receive analog or digital video data for projection by scanning projection device 2101. In other embodiments, data connector 2120 may mate directly with a connector on a device that sources video data.

Figure 22:
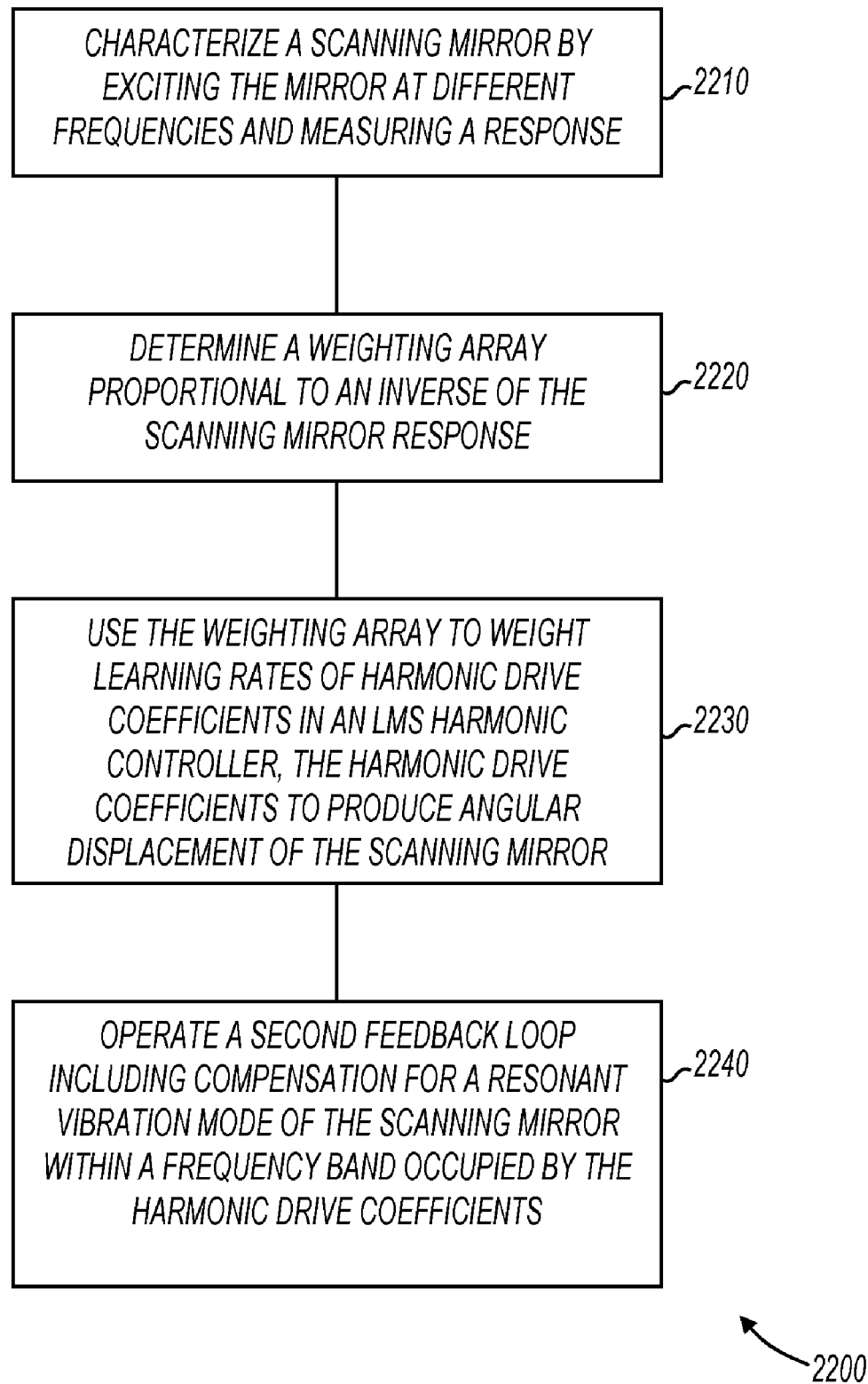
FIGS. 22 and 23 show flowcharts of methods in accordance with various embodiments of the present invention.

FIG. 22 shows a flowchart in accordance with various embodiments of the present invention. In some embodiments, method 2200, or portions thereof, is performed by a scanned beam projection system, embodiments of which are shown in previous figures. In other embodiments, all or portions of method 2200 are performed by a hardware/software combination in an electronic system. Method 2200 is not limited by the particular type of apparatus performing the method. The various actions in method 2200 may be performed in the order presented, or may be performed in a different order. Further, in some embodiments, some actions listed in FIG. 22 are omitted from method 2200.

Method 2200 is shown beginning with block 2210 in which a scanning mirror is characterized by exciting the mirror at different frequencies and measuring a response. The measured response may be over any range of frequencies. For example, in some embodiments, the response may be measured over the frequency range encompassed by the slow-scan drive coefficients. Also for example, in some embodiments, the excitation may span a large frequency range expected to discover resonant vibration modes up to and including the fast-scan resonant vibration mode. The result will be a response similar to that shown in FIG. 6.

At 2220, a weighting array proportional to an inverse of the scanning mirror response is determined. This corresponds to the calculation of the MirrorGain array described above. At 2230, the weighting array is used to weight learning rates of harmonic drive coefficients in an LMS harmonic controller such as controller 1010 (FIG. 10). The harmonic drive coefficients are used to produce angular displacement of the scanning mirror in the slow-scan direction. This corresponds to the operation of the LMS harmonic controller and LMS tone adders shown in FIGS. 10-12.

At 2240, a second feedback loop is operated, the second feedback loop including compensation for a resonant vibration mode of the scanning mirror within a frequency band occupied by the harmonic drive coefficients. For example, bridged-T compensator 1422 (FIG. 15) compensates for the resonant vibration mode found at 795 Hz. The second feedback loop may also include additional filtering for other ancillary resonant vibration modes, as well as LMS tone cancelling to remove unwanted tones (e.g., fast-scan frequency tones).

Figure 23:
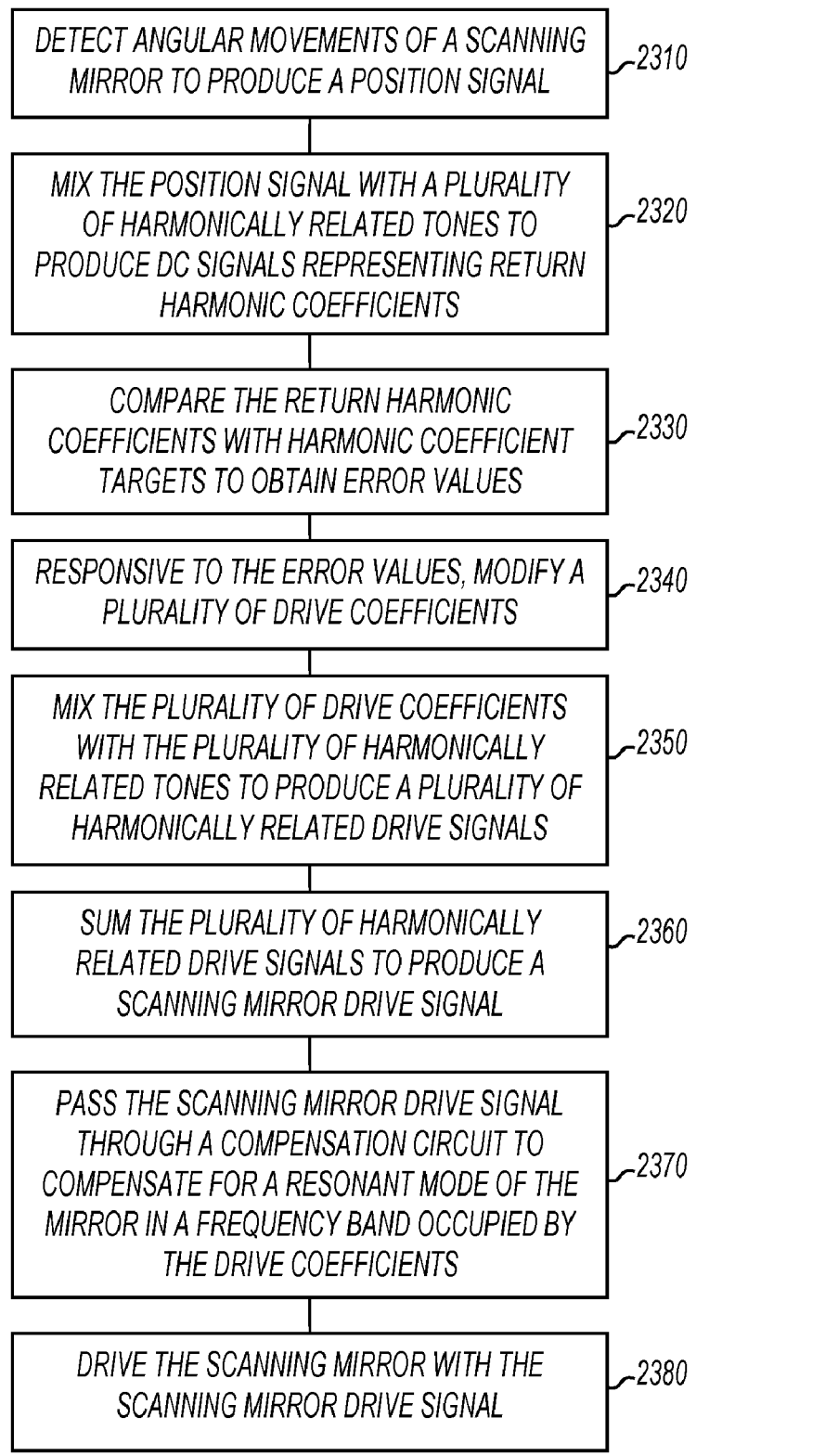

FIG. 23 shows a flowchart in accordance with various embodiments of the present invention. In some embodiments, method 2300, or portions thereof, is performed by a scanned beam projection system, embodiments of which are shown in previous figures. In other embodiments, all or portions of method 2300 are performed by a hardware/software combination in an electronic system. Method 2300 is not limited by the particular type of apparatus performing the method. The various actions in method 2300 may be performed in the order presented, or may be performed in a different order. Further, in some embodiments, some actions listed in FIG. 23 are omitted from method 2300.

Method 2300 is shown beginning with block 2310 in which angular movements of a scanning mirror are detected to produce a position signal. In some embodiments, this corresponds to a piezoresistive position sensor detecting an angular displacement of a MEMS scanning mirror. At 2320, the position signal is mixed with a plurality of harmonically related tones to produce DC signals representing return harmonic coefficients.

At 2330, the return harmonic coefficients are compared with harmonic coefficient targets to obtain error values. This corresponds to comparing $R_k$ and $T_k$ as described above with reference to previous figures. At 2340, a plurality of drive coefficients are modified responsive to the error values. In some embodiments, each of the plurality of drive coefficients is modified at a different rate. For example, a weighting array proportional to an inverse of a mirror response may be used to set learning rates.

At 2350, the plurality of drive coefficients is mixed with the plurality of harmonically related tones to produce a plurality of harmonically related drive signals, and at 2360, the plurality of harmonically related drive signals are summed to produce a scanning mirror drive signal.

At 2370, the scanning mirror drive signal is passed through a bridge-T compensator to compensate for a resonant mode of the mirror in a frequency band occupied by the drive coefficients, and at 2380, the scanning mirror is driven with the scanning mirror drive signal.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
    detecting angular movement of a scanning mirror to produce a position signal;
    mixing the position signal with a plurality of harmonically related tones to produce a plurality of DC signals representing return harmonic coefficients;
    comparing the return harmonic coefficients with harmonic coefficient targets to obtain error values;
    responsive to the error values, modifying a plurality of drive coefficients; and
    mixing the plurality of drive coefficients with the plurality of harmonically related tones to produce a plurality of harmonically related drive signals.

2. The method of claim 1 wherein modifying a plurality of drive coefficients comprises modifying the plurality of drive coefficients at different rates.

3. The method of claim 2 wherein the different rates are inversely related to a scanning mirror transfer function.

4. The method of claim 1 further comprising:
    summing the plurality of harmonically related drive signals to produce a scanning mirror drive signal; and
    driving the scanning mirror with the scanning mirror drive signal.

5. The method of claim 1 further comprising:
    summing the plurality of harmonically related drive signals to produce a scanning mirror drive signal; and
    passing the scanning mirror drive signal through a compensation circuit to substantially compensate for a resonant mode of the scanning mirror in a frequency band occupied by the drive coefficients.

6. The method of claim 5 further comprising passing the scanning mirror drive signal through a filter to remove spectral energy at a resonant frequency outside the frequency band occupied by the drive coefficients.

7. The method of claim 6 further comprising:
driving the scanning mirror with the scanning mirror signal.

8. An apparatus comprising:
a scanning mirror having a fast-scan axis and a slow-scan axis, the slow-scan axis having a position detector; and
a control loop that includes a plurality of least mean square (LMS) tone adders to determine harmonic coefficients of a drive signal in response to position information received from the position detectors.

9. The apparatus of claim 8 further comprising an inner control loop having compensation circuitry to compensate for a scanning mirror resonant vibration mode at a frequency within a frequency band occupied by the harmonic coefficients of the drive signal.

10. The apparatus of claim 9 wherein the inner control loop includes a bridged-T compensator to compensate for the scanning mirror resonant vibration mode.

11. The apparatus of claim 9 wherein the inner control loop includes filtering to remove spectral energy at one or more resonant frequencies that are outside the frequency band occupied by the harmonic coefficients of the drive signal.

12. The apparatus of claim 11 wherein the inner loop further comprises a least mean square (LMS) tone cancelling circuit to remove spectral energy corresponding to scanning mirror movement on the fast-scan axis.

13. The apparatus of claim 8 wherein the plurality of LMS tone adders operate to modify the harmonic coefficients of the drive signal at different rates.

14. The apparatus of claim 13 wherein each of the drive coefficients is modified by an amount proportional to an inverse of a scanning mirror frequency response.

15. The apparatus of claim 9 wherein each of the LMS tone adders comprises a multiplier to multiply the position information with a tone at a harmonic frequency.

16. The apparatus of claim 15 wherein each of the LMS tone adders further comprises a summer to compare a harmonic coefficient target with an output of the multiplier.

17. The apparatus of claim 16 wherein each of the LMS tone adders further comprises
a digital filter responsive to the summer; and
a second multiplier to multiply the tone at the harmonic frequency with an output of the digital filter.

18. A mobile device comprising:
a communications transceiver;
a scanning mirror; and
a slow-scan scanning mirror control system having a plurality of least mean square (LMS) tone adders to mix a position signal from the scanning mirror with a plurality of harmonically related tones, and to sum outputs from the plurality of LMS tone adders to generate a slow-scan drive signal.

19. The mobile device of claim 18 further comprising an inner loop that includes compensation circuitry for the scanning mirror.

20. The mobile device of claim 19 wherein the compensation circuitry compensates for a scanning mirror resonant vibration mode within a frequency band used to drive a slow-scan axis of the scanning mirror.

* * * * *